(12) United States Patent
Gierahn

(10) Patent No.: US 11,213,826 B2
(45) Date of Patent: Jan. 4, 2022

(54) CELLULAR CASSETTES FOR THE COLLECTION, STORAGE, AND ANALYSIS OF BIOLOGICAL SAMPLES

(71) Applicant: Honeycomb Biotechnologies, Inc., Weston, MA (US)

(72) Inventor: Todd Gierahn, Brookline, MA (US)

(73) Assignee: HONEYCOMB BIOTECHNOLOGIES, INC., Weston, MA (US)

(*) Notice: Subject to any disclaimer, the term of this patent is extended or adjusted under 35 U.S.C. 154(b) by 0 days.

(21) Appl. No.: 17/314,507

(22) Filed: May 7, 2021

(65) Prior Publication Data

US 2021/0331158 A1 Oct. 28, 2021

Related U.S. Application Data

(63) Continuation of application No. PCT/US2020/036197, filed on Jun. 4, 2020.

(60) Provisional application No. 62/858,773, filed on Jun. 7, 2019.

(51) Int. Cl.
*B01L 3/00* (2006.01)
*A01N 1/00* (2006.01)
*B01L 3/02* (2006.01)
*A01N 1/02* (2006.01)

(52) U.S. Cl.
CPC ........ *B01L 3/50855* (2013.01); *A01N 1/0242* (2013.01); *B01L 3/02* (2013.01); *B01L 2300/069* (2013.01); *B01L 2300/0681* (2013.01)

(58) Field of Classification Search
CPC ............... A01N 1/0242; B01L 3/50855; B01L 2300/0681
See application file for complete search history.

(56) References Cited

U.S. PATENT DOCUMENTS

| | | | | |
|---|---|---|---|---|
| 3,910,082 A | * | 10/1975 | Patriquin | E05B 1/0038 70/360 |
| 4,532,805 A | | 8/1985 | Flesher | |
| 4,909,287 A | | 3/1990 | Williams et al. | |
| 6,830,936 B2 | | 12/2004 | Anderson et al. | |

(Continued)

FOREIGN PATENT DOCUMENTS

DE 4101926 A1 * 7/1992 ............. A61D 19/00

OTHER PUBLICATIONS

"Gierahn, et al., "Seq-Well: portable, low-cost RNA sequencing of single cells at high throughput" Nature Methods (2017) Vo. 14, No. 4, p. 395-402".

(Continued)

*Primary Examiner* — Christopher Adam Hixson
(74) *Attorney, Agent, or Firm* — Wilson Sonsini Goodrich & Rosati

(57) ABSTRACT

Disclosed herein are cellular cassettes for the storage, collection, and analysis of biological samples. The cellular cassette can enable easy sample collection and sealing of microwell arrays with semi-permeable membrane for stable storage and future processing of single cells. Also disclosed herein are systems and kits comprising one or more described cassettes. The described cassettes, systems, and kits can be used to create barcoded, single-cell sequencing libraries. Further described herein are methods of using the cassettes, systems, and kits.

24 Claims, 12 Drawing Sheets

(56) References Cited

U.S. PATENT DOCUMENTS

| | | |
|---|---|---|
| 7,344,832 B2 | 3/2008 | Henderson et al. |
| 9,623,394 B2 | 4/2017 | Roth et al. |
| 9,840,732 B2 | 12/2017 | Anderson et al. |
| 2005/0059165 A9* | 3/2005 | Davis .................. B01L 3/0217 436/514 |
| 2007/0275456 A1 | 11/2007 | Marlborough et al. |
| 2013/0327700 A1* | 12/2013 | Ellis ..................... B01D 35/30 210/416.1 |
| 2017/0292151 A1* | 10/2017 | Connolly ........... C12N 15/1013 |
| 2019/0056415 A1 | 2/2019 | Lai et al. |
| 2019/0144936 A1 | 5/2019 | Gierahn et al. |
| 2019/0218607 A1 | 7/2019 | Love et al. |
| 2021/0215585 A1* | 7/2021 | Fruchter ........... A61B 10/0051 |

OTHER PUBLICATIONS

"Gierahn, et al., "Supplementary Tables: Seq-Well: A Portable, Low-Cost Platform for High-Throughput Single-Cell RNA-Seq of Low-Input Sample" Nature Methods (2017)".

"Hwang, et al., "Single-cell RNA sequencing technologies and bioinformatics pipelines" Experimental & Molecular Medicine (2018) p. 1-14".

"International Search Report and Written Opinion for corresponding PCT Application No. PCT/US2020/36197 dated Oct. 19, 2020".

* cited by examiner

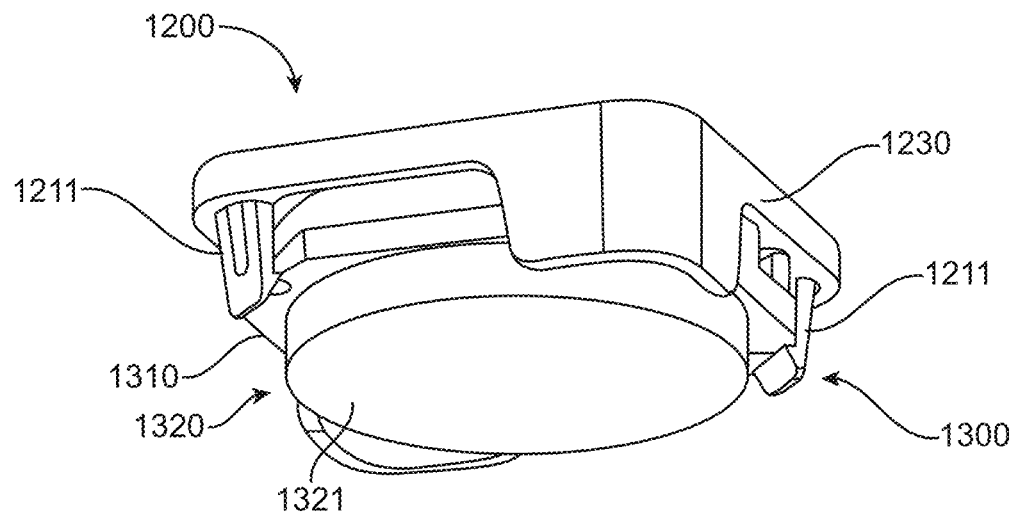
FIG. 4A
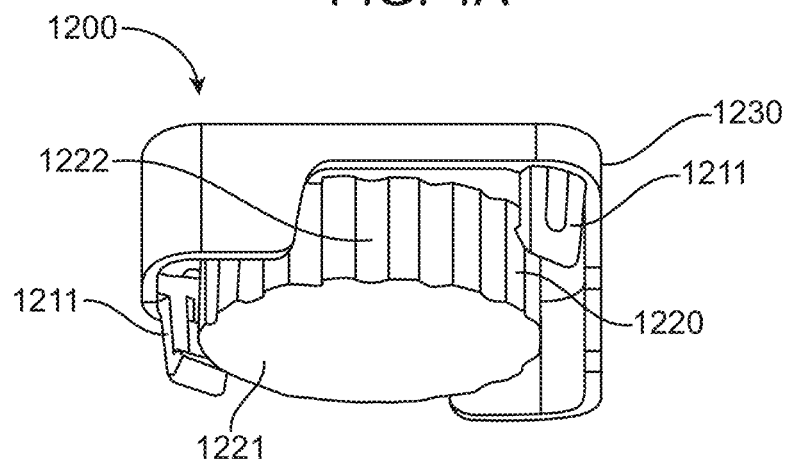
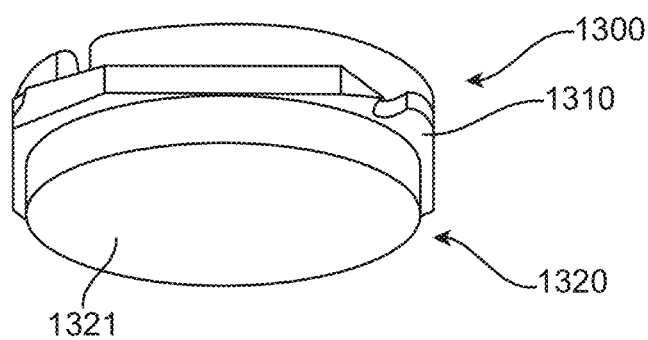
FIG. 4B

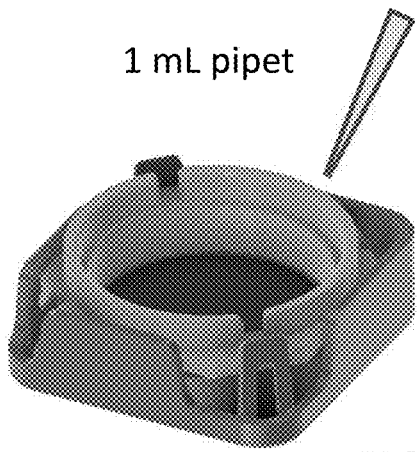

1 mL pipet

Wet array
- 1 mL methanol
- Incubate for 5 min
- Wash 3x PBS 0.1% BSA

Alternative
1 mL PBS 0.1% BSA
　1hr – overnight
　　No washing

FIG. 10A

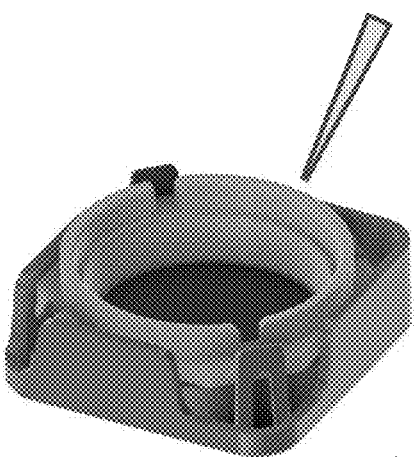

Load sample
- Remove wetting solution
- Add 1mL cell suspension
- Incubate static for 5min
- Agitate solution by pipetting 3x
- Incubate static for 5min

Alternative
Agitate by swirling

FIG. 10B

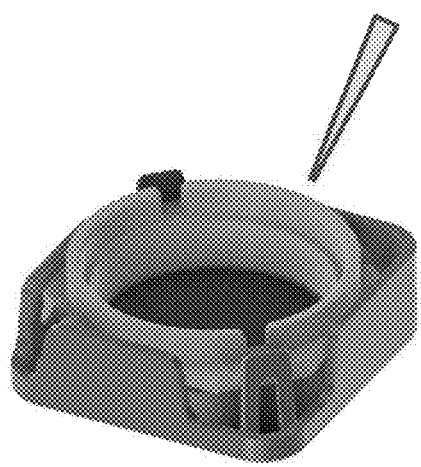

Fix cells
- Wash 2x with PBS
- Add 1 mL RNALater
- Incubate 10 min (optional)

Alternative
No washes if cell loading
　solution low in protein

FIG. 10C

Unsnap loading ring

Snap in membrane/plunger
Ensure enough space around array to accommodate displaced liquid

Aspirate excess storage buffer
Tilt array toward port to allow all displaced liquid to flow there for removal & # CELLULAR CASSETTES FOR THE COLLECTION, STORAGE, AND ANALYSIS OF BIOLOGICAL SAMPLES

CROSS-REFERENCE OF RELATED APPLICATIONS

This application is a continuation of International Application No. PCT/US2020/036197, filed Jun. 4, 2020, which claims benefit of U.S. Provisional Patent Application No. 62/858,773, filed Jun. 7, 2019, each of which is entirely incorporated herein by reference in its entirety.

BACKGROUND

Cell-based assays with single cell solution has drawn substantial interest due to the heterogeneity of gene expression. Accessing the differences in gene expression among individual cells can facilitate the identification of rare cell populations, which cannot be detected by analyzing pooled cells. The isolation and analysis of single cells can be performed in droplets-based platforms such as the Chromium System sold by 10× Genomics. Using the Chromium System, reactions are partitioned into nanoliter-scale droplets containing uniquely barcoded beads named GEMs (Gel Bead-in Emulsion). This technology can be used to partition single cells. The isolation and analysis of single cells can also be performed in microarray-based platforms such as Fluidigm Cl sold by Fluidigm and Seq-well described in US 20190144936A1.

However, the existing technologies fail to provide a solution that enables efficient asynchronous single-cell analysis. It is challenging to collect and store single cell samples prior to the creation of single-cell sequencing libraries using the existing droplets-based or microarray-based systems. Thus, there remains a need for devices and methods that facilitate the collection and storage of single cells prior to the creation of single-cell sequencing libraries. There remains a need for devices and methods that facilitate asynchronous single-cell analysis.

SUMMARY

Described herein are devices, systems, and methods for collecting, storing, or analyzing biological samples. The described devices, systems and methods offer significant advantages over existing technologies; for example, the herein-disclosed devices, systems and methods enable the collection and storage of biological samples for asynchronous single-cell analysis, and they enable scalable and cost-effective single-cell interrogation of samples, with the efficiency and quality of centralized analytical processing. As disclosed herein, biological samples can be captured in any settings including point-of-care locations. After the biological samples are captured, the biological state and biological information of the samples can be locked-in and preserved, and the integrity of the samples can be maintained as long as needed during storage, shipping, and eventual processing. In addition, the captured samples can be processed centrally, which improves efficiencies and reduces variabilities.

In one aspect, disclosed herein is a cassette for collecting, storing, or analyzing bioparticles, said cassette comprises: (a) a plunger assembly that comprises a plunger, wherein said plunger has a bottom surface; (b) a membrane assembly that comprises: (i) a semi-permeable membrane that comprises a membrane top surface and a membrane bottom surface, and (ii) a membrane frame configured to attach to said plunger, wherein said semi-permeable membrane is attached to said membrane frame, and wherein said membrane assembly is configured such that at least a portion of said bottom surface of said plunger is in contact with said membrane top surface when said membrane frame is attached to said plunger assembly; and (c) a loading assembly that comprises a microwell array and a base that supports the microwell array, wherein said microwell array comprises a top surface that comprises a plurality of microwells displaced therein, wherein said loading assembly is configured such that at least a portion of said top surface of said microwell array is in contact with said membrane bottom surface when said membrane assembly is attached to the loading assembly, and wherein said contact between said membrane bottom surface and said top surface of said microwell array is configured to retain one or more bioparticles in said microwell array. In one aspect, disclosed herein is a cassette for collecting, storing, or analyzing bioparticles, said cassette comprises: (a) a plunger that comprises a top surface and a bottom surface; (b) a membrane assembly that comprises: (i) a semi-permeable membrane that comprises a membrane top surface and a membrane bottom surface, and (ii) a membrane frame configured to attach to said plunger, wherein said semi-permeable membrane is attached to said membrane frame, and wherein said membrane assembly is configured to allow at least a portion of said bottom surface of said plunger to be in contact with said membrane top surface when said membrane frame is attached to said plunger; (c) a loading assembly that comprises a base and a microwell array, wherein said microwell array comprises a top surface and a plurality of microwells, wherein said loading assembly is configured to allow at least a portion of said top surface of said microwell array to be in contact with said membrane bottom surface, and wherein said contact is capable of retaining one or more bioparticles in said microwell array. In some embodiments, the cassette comprises a locking mechanism that is capable of locking the plunger and the membrane assembly in place with the loading assembly. In some embodiments, the cassette comprises a locking mechanism that is configured to lock said plunger assembly and said membrane assembly in place with said loading assembly. In some embodiments, the locking mechanism is configured to maintain said contact between said top surface of said microwell array and said membrane bottom surface. In some embodiments, the plunger assembly comprises a top locking member. In some embodiments, the plunger comprises a top locking member. In some embodiments, the base comprises a bottom locking member that is configured to engage the top locking member. In some embodiments, the bottom locking member is configured to engage the top locking member through a snap trap mechanism. In some embodiments, the contact between the top surface of the microwell array and the membrane bottom surface is maintained by engaging the top locking member and the bottom locking member. In some embodiments, the bottom surface of the plunger comprises a curved surface. In some embodiments, the bottom surface of the plunger comprises a convex surface. In some embodiments, the bottom surface of the plunger comprises an elastomeric surface. In some embodiments, the bottom surface of the plunger is substantially circular. In some embodiments, the said plunger comprises a side surface that comprises one or more cutouts. In some embodiments, the one or more cutouts are groves that runs vertically on the plunger. In some embodiments, the plunger assembly comprises a rigid top surface. In some embodiments, the plunger assembly comprises a top surface that comprises a mechanism, through which the position of the plunger assembly or the cassette can be set or manipulated. In some embodiments, the mechanism on the top surface of the plunger assembly comprises a handle. In some embodiments, the top surface of the plunger comprises a rigid surface. In some embodiments, the top surface of the plunger comprises a handle. In some embodiments, the semi-permeable membrane has an average pore diameter of at least 1 nm, at least 10 nm, at least 20 nm, at least 30 nm, at least 40 nm, at least 50 nm, at least 75 nm, at least 100 nm, at least 200 nm, at least 300 nm, at least 400 nm, at least 500 nm, at least 600 nm, at least 700 nm, at least 800 nm, at least 900 nm, or at least 1000 nm. In some embodiments, the semi-permeable membrane has an average pore diameter of at most 20 nm, at most 30 nm, at most 40 nm, at most 50 nm, at most 75 nm, at most 100 nm, at most 200 nm, at most 300 nm, at most 400 nm, at most 500 nm, at most 600 nm, at most 700 nm, at most 800 nm, at most 900 nm, at most 1 µm, at most 2 µm, at most 3 µm, at most 5 µm, or at most 10 µm. In some embodiments, the semi-permeable membrane has an average pore diameter of from about 1 nm to about 200 nm. In some embodiments, the semi-permeable membrane is configured to retain one or more beads, one or more bioparticles, or both. In some embodiments, the bioparticles comprise a cell, a genome, a nucleic acid, a virus, a nucleus, a protein, a peptide, or a combination thereof. In some embodiments, the bioparticles comprise one or more cells. In some embodiments, the one or more cells comprise a bacteria cell, a plant cell, an animal cell, or a combination thereof. In some embodiments, the one or more cells comprise a mammalian cell. In some embodiments, the one or more cells comprise a blood cell. In some embodiments, the membrane assembly has a substantially circular shape. In some embodiments, the membrane frame is configured to reversibly attach to the plunger. In some embodiments, the membrane frame is configured to reversibly attach to said plunger or to said plunger assembly. In some embodiments, the membrane frame is rigid. In some embodiments, the membrane frame comprises a cylindrical shape. In some embodiments, the at least a portion of said bottom surface of said plunger is in direct contact with said membrane top surface when said membrane frame is attached to said plunger assembly. In some embodiments, when said membrane frame is attached to said plunger assembly, said at least a portion of the bottom surface of the plunger is in contact with said membrane top surface through a medium, which is situated between said semi-permeable membrane and said plunger. In some embodiments, the medium comprises an adsorbent material. In some embodiments, the adsorbent material comprises paper or superabsorbent polymers. In some embodiments, the medium comprises cell preservation solution. In some embodiments, the medium functions as a reservoir for solution. In some embodiments, the medium functions as a fluid reservoir. In some embodiments, the membrane assembly is configured to allow the bottom surface of the plunger to be in contact with the membrane top surface when the membrane frame is attached to the plunger. In some embodiments, the membrane assembly is pre-attached to the plunger. In some embodiments, the membrane assembly is pre-attached to the plunger assembly. In some embodiments, the membrane assembly is configured to reversibly attach to the loading assembly. In some embodiments, membrane bottom surface comprises one or more reactive functional groups. In some embodiments, the reactive functional groups comprise an amine, an aminosilane, a thiosilane, a methacrylate silane, a poly(allylamine), a maleimide, a 2-iminothiolane, a functional group derived from polyacrylic acid or bisepoxy-PEG, or a combination thereof. In some case the top surface of the microwell array comprises one or more reactive functional groups. In some embodiments, the reactive functional groups comprise an amine, an aminosilane, a thiosilane, a methacrylate silane, a poly(allylamine), poly(lysine), BSA, epoxide silane, chitosan, 2-iminothiolane, a functional group derived from polyacrylic acid, bisepoxy-PEG, or oxidized agarose, or a combination thereof. In some embodiments, the microwell array comprises one or more cut outs. In some embodiments, the one or more cut outs comprise a cut out located at the center of the array, a cut out located on the side of the array, or both. In some embodiments, the microwell array comprises from about 5000 to about 1,000,000 microwells. In some embodiments, the microwell array comprises from about 50,000 to about 150,000 microwells. In some embodiments, the average diameter of the microwells on the top surface is at least 5 microns, at least 7 microns, at least 10 microns, at least 20 microns, at least 30 microns, at least 45 microns, at least 50 microns, or at least 100 microns. In some embodiments, the average diameter of the microwells on the top surface is at most 1000 microns, at most 500 microns, at most 400 microns, at most 300 microns, at most 200 microns, at most 100 microns, at most 75 microns, at most 50 microns, at most 40 microns, at most 30 microns, at most 20 microns, at most 10 microns, or at most 5 microns. In some embodiments, the average diameter of the microwells on the top surface is from about 5 microns to about 50 microns. In some embodiments, the loading assembly comprises an elevated loading ring surrounding the microwell array. In some embodiments, the loading ring comprises a hydrophobic inward-facing surface. In some embodiments, the loading ring is part of the base. In some embodiments, the loading ring is reversibly attachable to the base. In some embodiments, the loading ring comprises a lid that covers the microwell array. In some embodiments, the loading assembly comprises a lid that covers the microwell array. In some embodiments, the lid comprises one or more openings. In some embodiments, the loading ring is configured to retain fluid on the microwell array. In some embodiments, the loading ring is configured to retain from about 0.1 ml to about 5 ml fluid. In some embodiments, the base comprises a recessed area relative to the microwell array. In some embodiments, the recessed area is capable of accommodating the fluid retained by the loading ring. In some embodiments, the recessed area is configured to accommodate the fluid retained by said loading ring. In some embodiments, the base comprises one or more ports configured to allow liquid removal. In some embodiments, the one or more ports are situated on the side of the base. In some embodiments, the one or more ports are situated on the bottom of the base. In some embodiments, the base comprises one or more channels that are capable of facilitating a fluid flow from the recessed area to the one or more ports. In some embodiments, the base comprises one or more channels that are configured to facilitate a fluid flow from said recessed area to said one or more ports. In some embodiments, the loading assembly is configured to allow the top surface of the microwell array to be in contact with the membrane bottom surface, thereby sealing the microwell array. In some embodiments, the base comprises one or more key holes configured to allow an insert of one or more keys, wherein the insert of one or more keys disengages the top locking member and the bottom locking member. In some embodiments, the insert releases the plunger from the loading assembly and the membrane assembly. In some embodiments, the insert releases said plunger assembly from said loading assembly. In some embodiments, the microwell array comprises a plurality of beads. In some embodiments, at least 80%, 85%, 90%, 95%, 99%, 99.9%, or 100% of the microwells contain a single bead. In some embodiments, one or more of the plurality of microwells comprise a single bead. In one aspect, disclosed herein is a cassette for collecting, storing, or analyzing bioparticles, said cassette comprises: (a) a membrane assembly that comprises a membrane frame and a semi-permeable membrane attached to said membrane frame, wherein said semi-permeable membrane comprises a membrane top surface and a membrane bottom surface, wherein at least a portion of said membrane top surface and membrane bottom surface are unsupported by any substrate; and (b) a loading assembly that comprises a base and a microwell array, wherein said microwell array comprises a top surface and a plurality of microwells, wherein said membrane assembly is reversibly attachable to said loading assembly, and when said membrane assembly is attached to said loading assembly, said membrane bottom surface is in contact with said top surface of said microwell arrays. In one aspect, disclosed herein cassette for collecting, storing, or analyzing bioparticles, said cassette comprises: (a) a membrane assembly that comprises a membrane frame and a semi-permeable membrane attached to said membrane frame, wherein said semi-permeable membrane comprises a membrane top surface and a membrane bottom surface, wherein at least a portion of said membrane top surface and membrane bottom surface are unsupported by any substrate; and (b) a loading assembly that comprises a base and a microwell, wherein said membrane assembly is reversibly attachable to said loading assembly, and when said membrane assembly is attached to said loading assembly, said membrane bottom surface is in contact with said microwell. In some embodiments, the contact between the membrane bottom surface and the top surface of the microwell is configured to retain one or more beads, one or more bioparticles, or both. In one aspect, disclosed herein is a cassette for collecting, storing, or analyzing bioparticles, said cassette comprises: (a) a membrane assembly that comprises a membrane frame and a semi-permeable membrane, wherein said semi-permeable membrane comprises a membrane top surface and a membrane bottom surface, wherein at least a portion of said membrane top surface and membrane bottom surface are unsupported by any substrate; and (b) a loading assembly that comprises a base and a microwell array, wherein said microwell array comprises a top surface and a plurality of microwells, and wherein said membrane bottom surface is configured to bond with at least a portion of said top surface of said loading assembly. In one aspect, disclosed herein is a cassette for collecting, storing, or analyzing bioparticles, said cassette comprises: (a) a semi-permeable membrane that comprises a membrane top surface and a membrane bottom surface, wherein at least a portion of said membrane top surface and membrane bottom surface are unsupported by any substrate; and (b) a loading assembly that comprises a base and a microwell array, wherein said microwell array comprises a top surface and a plurality of microwells, and wherein said membrane bottom surface is configured to bond with at least a portion of said top surface of said loading assembly. In some embodiments, (i) the membrane bottom surface, (ii) the top surface of the loading assembly, or both comprise one or more reactive functional groups. In some embodiments, the membrane top surface and the membrane bottom surface are unsupported by any substrate. In some embodiments, the cassette comprises a plunger assembly that comprises a plunger, and wherein the plunger assembly is reversibly attachable to said membrane assembly. In some embodiments, the plunger is in contact with said membrane top surface when said plunger assembly is attached to said membrane assembly. In some embodiments, the plunger contacts said membrane top surface directly or through a fluid reservoir. In one aspect, disclosed herein is a cassette for collecting, storing, or analyzing bioparticles, said cassette comprises: (a) a semi-permeable membrane that comprises a membrane top surface and a membrane bottom surface, and (b) a loading assembly that comprises a base and a microwell array, wherein said microwell array comprises a top surface and a plurality of microwells, wherein said semi-permeable membrane is configured to bond to at least a portion of said top surface of said microwell array. In one aspect, disclosed herein is a cassette for collecting, storing, or analyzing bioparticles, said cassette comprises: (a) a semi-permeable membrane that comprises a membrane top surface and a membrane bottom surface, and (b) a loading assembly that comprises a base and a top surface that comprises a microwell displaced therein, wherein said semi-permeable membrane is configured to bond to at least a portion of said top surface. In one aspect, disclosed herein is a cassette for collecting, storing, or analyzing bioparticles, said cassette comprises: (a) a semi-permeable membrane that comprises a membrane top surface and a membrane bottom surface, and (b) a loading assembly that comprises a base and a microwell array, wherein said microwell array comprises a top surface and a plurality of microwells, wherein said semi-permeable membrane is configured to bond to at least a portion of said top surface of said microwell array, and wherein said bonding does not require a heating process. In some embodiments, the bonding between the membrane bottom surface and the microwell array retains one or more bioparticles in said microwells. In some embodiments, the membrane bottom surface is configured to bond with at least a portion of the top surface of said loading assembly under a temperature of below 50° C., 45° C., 40° C., 35° C., or 30° C. In some embodiments, the membrane bottom surface is configured to bond with at least a portion of the top surface of said loading assembly under ambient temperature. In some embodiments, the bonding is reversible. In some embodiments, the membrane bottom surface is configured to bond with at least a portion of said top surface of the microwell array at a temperature of below 50° C., 45° C., 40° C., 35° C., or 30° C. In some embodiments, the membrane bottom surface is configured to bond with at least a portion of said top surface of the microwell array under ambient temperature.

In one aspect, disclosed herein is a cassette for collecting, storing, or analyzing bioparticles, said cassette comprises, from top to bottom: (a) a plunger assembly that comprises a top surface, a plunger, and a top locking member, wherein said plunger comprises a bottom surface; (b) a membrane assembly that comprises: (i) a semi-permeable membrane that comprises a membrane top surface and a membrane bottom surface, and (ii) a membrane frame configured to reversibly attach to said plunger assembly, wherein said semi-permeable membrane is attached to said membrane frame, and wherein said membrane assembly is configured to allow at least a portion of said bottom surface of said plunger to be in contact with said membrane top surface when said membrane frame is attached to said plunger assembly; and (c) a loading assembly that comprises: (i) a base that comprises a bottom locking member, and (ii) a microwell array situated on said base, wherein said microwell array comprises a top surface and a plurality of microwells, wherein said bottom locking member is configured to engage with said top locking member, thereby maintaining a contact between at least a portion of said membrane bottom surface and at least a portion of said top surface of said microwell array. In one aspect, disclosed herein is a cassette for collecting, storing, or analyzing bioparticles, said cassette comprises, from top to bottom: (a) a plunger assembly that comprises a top surface, a plunger, and a top locking member, wherein said plunger comprises a bottom surface; (b) a membrane assembly that comprises: (i) a semi-permeable membrane that comprises a membrane top surface and a membrane bottom surface, and (ii) a membrane frame that holds said semi-permeable membrane, wherein said membrane frame is attached to said plunger assembly, wherein said bottom surface of the plunger is in contact with said membrane top surface; and (c) a loading assembly that comprises: (i) a base that comprises a bottom locking member, and (ii) a microwell array situated on said base, wherein said microwell array comprises a top surface and a plurality of microwells, wherein said bottom locking member is configured to engage with said top locking member, thereby maintaining a contact between at least a portion of said membrane bottom surface and at least a portion of said top surface of said microwell array. In one aspect, disclosed herein is a cassette for collecting, storing, or analyzing bioparticles, said cassette comprises, from top to bottom: (a) a plunger assembly that comprises a top surface, a plunger, and a top locking member, wherein said plunger comprises a bottom surface; (b) a membrane assembly that comprises: (i) a semi-permeable membrane that comprises a membrane top surface and a membrane bottom surface, and (ii) a membrane frame configured to reversibly attach to said plunger assembly, wherein said semi-permeable membrane is attached to said membrane frame, and wherein said membrane assembly is configured to allow at least a portion of said bottom surface of said plunger to be in contact with said membrane top surface when said membrane frame is attached to said plunger assembly; and (iii) a bottom locking member that is configured to engage with said top locking member; and (c) a loading assembly that comprises a microwell array situated on a base, wherein said microwell array comprises a top surface and a plurality of microwells. In one aspect, disclosed herein is a cassette for collecting, storing, or analyzing bioparticles, said cassette comprises, from top to bottom: (a) a plunger assembly that comprises a top surface, a plunger, and a top locking member, wherein said plunger comprises a bottom surface; (b) a membrane assembly that comprises: (i) a semi-permeable membrane that comprises a membrane top surface and a membrane bottom surface, and (ii) a membrane frame that holds said semi-permeable membrane, wherein said membrane frame is attached to said plunger assembly, wherein said bottom surface of the plunger is in contact with said membrane top surface; and (i) a bottom locking member that is configured to engage with said top locking member; and (ii) a loading assembly that comprises a microwell array situated on a base, wherein said microwell array comprises a top surface and a plurality of microwells. In some embodiments, the bottom surface of the plunger is in contact with said membrane top surface through a fluid reservoir that comprises an adsorbent material and a cell preservation solution. In some embodiments, the base comprises one or more ports for fluid collection. In one aspect, disclosed herein is a cassette for collecting, storing, or analyzing bioparticles, said cassette comprises, from top to bottom: (a) a plunger assembly that comprises a top surface, a plunger, and a top locking member, wherein said plunger comprises a bottom surface; (b) a membrane assembly that comprises: a semi-permeable membrane that comprises a membrane top surface and a membrane bottom surface, and a membrane frame configured to reversibly attach to said plunger assembly, wherein said semi-permeable membrane is attached to said membrane frame, and wherein said membrane assembly is configured to allow at least a portion of said bottom surface of said plunger to be in contact with said membrane top surface when said membrane frame is attached to said plunger assembly; and (c) a loading assembly that comprises: a base that comprises a bottom locking member and one or more ports for fluid collection, and a microwell array bonded to said base, wherein said microwell array comprises a top surface and a plurality of microwells, wherein said bottom locking member is configured to engage with said top locking member, thereby maintaining a contact between at least a portion of said membrane bottom surface and at least a portion of said top surface of said microwell array. In one aspect, disclosed herein is a cassette for collecting, storing, or analyzing bioparticles, said cassette comprises, from top to bottom: (a) a plunger assembly that comprises a top surface, a plunger, and a top locking member, wherein said plunger comprises a bottom surface; (b) a membrane assembly that comprises: a semi-permeable membrane that comprises a membrane top surface and a membrane bottom surface, and a membrane frame that holds said semi-permeable membrane, wherein said membrane frame is attached to said plunger assembly, wherein said bottom surface of the plunger is in contact with said membrane top surface; and (c) a loading assembly that comprises: a base that comprises a bottom locking member and one or more ports for fluid collection, and a microwell array bonded to said base, wherein said microwell array comprises a top surface and a plurality of microwells, wherein said bottom locking member is configured to engage with said top locking member, thereby maintaining a contact between at least a portion of said membrane bottom surface and at least a portion of said top surface of said microwell array. In some embodiments, the bottom surface of the plunger is in contact with said membrane top surface through a fluid reservoir that comprises an adsorbent material and a cell preservation solution. In some embodiments, at least one of said microwells comprises a single bioparticle. In some embodiments, the cassette comprises at least 1000 microwells that each comprises a single bioparticle. In some embodiments, the single bioparticle is a single cell or a single bead. In one aspect, disclosed herein is a cassette for collecting, storing, or analyzing bioparticles, said cassette comprises: (a) a plunger that comprises a top surface, a bottom surface, and a top locking member; (b) a membrane assembly that comprises: (i) a semi-permeable membrane that comprises a membrane top surface and a membrane bottom surface, and (ii) a membrane frame configured to reversibly attach to said plunger, wherein said semi-permeable membrane is attached to said membrane frame, and wherein said membrane assembly is configured to allow at least a portion of said bottom surface of said plunger to be in contact with said membrane top surface when said membrane frame is attached to said plunger; (b) a loading assembly that comprises: (i) a base that comprises a bottom locking member and one or more ports, and (ii) a microwell array bonded to said base, wherein said microwell array comprises a top surface and a plurality of microwells, wherein said bottom locking member is configured to engage with said top locking member, thereby maintaining a contact between at least a portion of said membrane bottom surface and at least a portion of said top surface of said microwell array, and wherein said one or more ports are configured to allow liquid removal when said top locking member is engaged with said bottom locking member.

In one aspect, disclosed herein is a system for collecting, storing, or analyzing bioparticles, said system comprises: (a) one or more described cassettes; and (b) a cassette frame configured to hold said one or more cassettes. In some embodiments, the cassette frame is configured according to Society for Biomolecular Screening (SBS) standard. In some embodiments, the system comprises from 1 to about 300 of said cassettes. In some embodiments, the system comprises about 6, about 8, about 12, about 24, about 96, or about 120 of said cassettes. In some embodiments, the system comprises one or more keys that are configured such that when the keys are inserted to said cassettes, one or more plunger assemblies are released from one or more loading assemblies. In some embodiments, the keys are built into said cassette frame. In some embodiments, at least two of said one or more cassettes are pre-connected. In some embodiments, the system comprises one or more bioparticle collection units. In some embodiments, the collection units comprise one or more collection plates that each comprises a plurality of recesses. In some embodiments, the collection units comprise one or more conically-shaped cassette collectors. In some embodiments, the cassette collectors comprise an opening at the center that is configured to allow beads to pass through. In one aspect, disclosed herein is a system for collecting, storing, or analyzing bioparticles, said system comprises: two or more cassettes, wherein each of said cassettes comprises (a) a membrane assembly that comprises a semi-permeable membrane, and (b) a loading assembly that comprises a base and a microwell array, wherein said microwell array comprises a top surface and a plurality of microwells, wherein said semi-permeable membrane is configured to contact at least a portion of said top surface of the microwell array when said membrane assembly is attached to said loading assembly, and wherein said membrane assemblies in at least two of the two or more cassettes are configured to be attached to or released from said microwell array simultaneously. In one aspect, disclosed herein is a system for collecting, storing, or analyzing bioparticles, said system comprises: two or more cassettes, wherein each of said cassettes comprises (a) a membrane assembly that comprises an impermeable membrane, and (b) a loading assembly that comprises a base and a microwell array, wherein said microwell array comprises a plurality of microwells that each comprises a bottom surface and an opening at the top, and wherein said bottom surface of the microwells comprises a semi-permeable membrane, wherein said impermeable membrane is configured to seal at least one of said openings at the top of said microwells when said membrane assembly is attached to said loading assembly, and wherein said membrane assemblies in at least two of the two or more cassettes are configured to be attached to or released from said microwell array simultaneously. In another aspect, disclosed herein is a system for collecting, storing, or analyzing bioparticles, said system comprises: (a) one or more cassettes as described herein; (b) one or more keys that are capable of releasing said plunger from said loading assembly; and (c) a Society for Biomolecular Screening (SBS) standard-sized frame configured to hold said one or more cassettes. In some embodiments, the system comprises from 1 to about 300 of the cassettes. In some embodiments, the system comprises about 6, about 8, about 12, about 24, about 96, or about 120 of the cassettes. In some embodiments, the keys are built into the SBS frame. In some embodiments, at least two of the one or more cassettes are pre-connected. In some embodiments, the system comprises one or more bioparticles collection units. In some embodiments, the collection units comprise one or more collection plates that each comprises a plurality of recesses. In some embodiments, the collection units comprise one or more conically-shaped cassette collectors. In some embodiments, the cassette collectors comprise a hole at the center that allows beads to pass through. In one aspect, disclosed herein is a system for collecting, storing, or analyzing bioparticles, said system comprises: two or more cassettes, wherein each of said cassettes comprises (a) a semi-permeable membrane, and (b) a loading assembly that comprises a base and a microwell array, wherein said microwell array comprises a top surface and a plurality of microwells, wherein said semi-permeable membrane in at least two of the two or more cassettes are configured to be attached to or released from said microwell array simultaneously.

In another aspect disclosed herein is a kit for collecting, storing, or analyzing bioparticles, the kit comprises: one or more cassettes as disclosed herein, or a system as disclosed herein; and one or more reagents. In some embodiments, the beads are pre-loaded into the microwells. In some embodiments, the one or more reagents comprise a wetting solution, a wash fluid, a lysis buffer, a fixative, a tissue storage reagent, a cell culture media, or a combination thereof. In some embodiments, a device can comprise one or more cells. In some embodiments, a device can comprise one or more nucleic acids. In some embodiments, the kit comprises instructions that provide a protocol of using said one or more cassettes or said system.

In another aspect, disclosed herein is a method for collecting, storing, or analyzing bioparticles using a cassette of as disclosed herein, a system as disclosed herein, or a kit as disclosed herein. In one aspect, disclosed herein is a method for collecting, storing, or analyzing bioparticles using a cellular cassette, wherein said cellular cassette comprises: (a) a plunger assembly that comprises a plunger; (b) a membrane assembly that comprises a membrane frame and a membrane that comprises a membrane top surface and a membrane bottom surface; and (c) a loading assembly that comprises a base and a microwell array situated on the base, wherein said microwell array comprises a top surface and a plurality of microwells; wherein said method comprising: loading a sample fluid that comprises one or more bioparticles onto said microwell array, thereby loading at least one bioparticle into one of said microwells; applying said membrane assembly onto said microwell array, wherein said membrane assembly is attached to said plunger assembly; and contacting at least a portion of said top surface of said microwell array with at least a portion of said membrane bottom surface, and wherein said contact retains at least one bioparticle in one of said microwells. In some embodiments, the applying and contacting occur simultaneously. In some embodiments, the membrane is semi-permeable. In some embodiments, each of said plurality of microwells comprises an opening at the top and a bottom surface, wherein the bottom surface comprises semi-permeable membrane. In another aspect, disclosed herein is a method for collecting, storing, or analyzing bioparticles using a cellular cassette, the method comprising: loading a sample fluid that comprises one or more bioparticles onto a microwell array that is situated on a base, wherein the microwell array comprises a top surface and a plurality of microwells, thereby loading at least one bioparticle into one of the microwells; applying a membrane assembly onto the microwell array, wherein the membrane assembly is attached a plunger, and wherein the membrane assembly comprises a membrane frame and a semi-permeable membrane that comprises a membrane top surface and a membrane bottom surface; and contacting at least a portion of the top surface of the microwell array with at least a portion of the membrane bottom surface, and wherein the contact retains the at least one bioparticles in one of the microwells. In some embodiments, the method comprises attaching an elevated loading ring that surrounds the microwell array before the sample fluid is loaded. In some embodiments, the method comprises wetting the microwell array before the sample fluid is loaded. In some embodiments, the wetting comprises loading a wetting solution onto the microwell array. In some embodiments, the wetting further comprises removing the wetting solution from the microwell array. In some embodiments, the wetting comprises washing the microwell array with a wash buffer. In some embodiments, the wetting comprises loading a wash buffer onto the microwell array and leaving the buffer on the microwell array for about 30 minutes to about 24 hours. In some embodiments, the wetting further comprises removing the wash buffer. In some embodiments, the sample fluid is loaded by pipetting. In some embodiments, the method further comprises agitating the loaded sample fluid. In some embodiments, the method further comprises incubating the loaded sample fluid. In some embodiments, a ratio of the number of bioparticles in the sample fluid to the number of microwells in the microwell array is from about 1:100 to about 1:1. In some embodiments, the ratio of the number of bioparticles in the sample fluid to the number of microwells in the microwell array is from about 1:20 to about 1:4. In some embodiments, at least 50%, at least 60%, at least 70%, at least 80%, at least 90%, at least 91%, at least 92%, at least 93%, at least 94%, at least 95%, at least 96%, at least 97%, at least 99%, or at least 99% of the bioparticles in the sample fluid are loaded in the microwells. In some embodiments, the method further comprises applying a storage buffer to the microwell array after the sample fluid is loaded. In some embodiments, the method comprises removing the loading ring after the sample fluid is loaded. In some embodiments, the membrane assembly is reversibly attached to the plunger. In some embodiments, the plunger comprises a top surface and a bottom surface, and wherein at least a portion of the plunger bottom surface contacts the membrane top surface. In some embodiments, the at least a portion of said plunger bottom surface contacts said membrane top surface directly or through a medium. In some embodiments, the medium comprises a layer of adsorbent material and a cell preservation solution. In some embodiments, the plunger bottom surface comprises a curved surface. In some embodiments, the membrane assembly is applied to the microwell array by manipulating the plunger. In some embodiments, at least a fraction of fluid is displaced after the membrane assembly is applied to the microwell array. In some embodiments, the displaced fluid comprises a fraction of the sample fluid, a fraction of the wetting solution, a fraction of the wash buffer, a fraction of the storage buffer, or a combination thereof. In some embodiments, the displaced fluid is removed from one or more ports located on the side of the base. In some embodiments, the contact between the top surface of the microwell array and the membrane bottom surface retains at least 1000 bioparticles in said microwells. In some embodiments, the method further comprises storing the retained at least one bioparticle for one or more days. In some embodiments, the method comprises releasing the plunger from the membrane assembly, thereby exposing the membrane top surface. In some embodiments, the bioparticles are beads that comprise biomaterials. In some embodiments, the bioparticles are mammalian cells. In some embodiments, the microwell array is pre-loaded with a plurality of beads. In some embodiments, the method further comprises lysing at least one of the cells, thereby releasing an RNA from the cell. In some embodiments, the method comprises capturing the RNA on a bead resident in the same microwell as at least one of the cells. In some embodiments, the method comprises capturing said RNA on a bead resident in the same microwell as said lysed cell. In some embodiments, the method further comprises removing the membrane assembly from the microwell array. In some embodiments, the method comprises collecting at least a portion of the plurality of beads. In some embodiments, the method comprises building a DNA or RNA library of said bioparticles. In some embodiments, the method comprises placing two or more of said cellular cassettes onto a cassette frame. In some embodiments, the method comprises releasing said plunger assemblies of the two or more cassettes on the cassette frame concurrently. In some embodiments, the method comprises collecting at least one bioparticle from each of the two or more cassettes on the cassette frame concurrently.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of exemplary embodiments are set forth with particularity in the appended claims. A better understanding of the features and advantages will be obtained by reference to the following detailed description that sets forth illustrative embodiments, in which exemplary embodiments are utilized, and the accompanying drawings of which:

FIG. 1A shows a perspective view of a loading assembly with a loading ring attached, illustrating the loading assembly, the loading ring, the microwell array, the base of the loading assembly, the snap clips, and the port for fluid collection. FIG. 1B shows an exploded view of a loading assembly, illustrating the loading assembly, the loading ring, the microwell array, the base, the snap clips, a key hole, and the port for fluid collection.

FIG. 2A shows a perspective view of a loading assembly, illustrating the loading assembly, the base of the loading assembly, the snap clips, the port for fluid collection, the injection lid, and a cutout on the injection lid for guiding pipetting. FIG. 2B shows a perspective view of the injection lid with a cutout for guiding pipetting.

FIGS. 4A-4B show a perspective view of a plunger and a membrane assembly. FIG. 4A shows a perspective view of a membrane assembly attached to the plunger assembly, illustrating the membrane assembly, the plunger assembly, the snap top, the snap clips, the membrane, the membrane frame, and the membrane bottom surface. The plunger is not shown in FIG. 4A. FIG. 4B shows a perspective view of a membrane assembly and a plunger assembly, unattached to each other, illustrating the membrane assembly, the plunger assembly, the snap top, the snap clips, the plunger, the plunger bottom surface, the plunger side surface, the membrane, the membrane frame, and the membrane bottom surface.

FIGS. 10A-10C illustrate a schematic describing an exemplary protocol including array wetting (FIG. 10A), sample loading (FIG. 10B), cell fixing (FIG. 10C), and alternative procedures.

FIG. 12A shows a plunger assembly; FIG. 12B shows a membrane assembly; and FIG. 12C shows a loading assembly.

DETAILED DESCRIPTION

Definitions

Figure 1A:
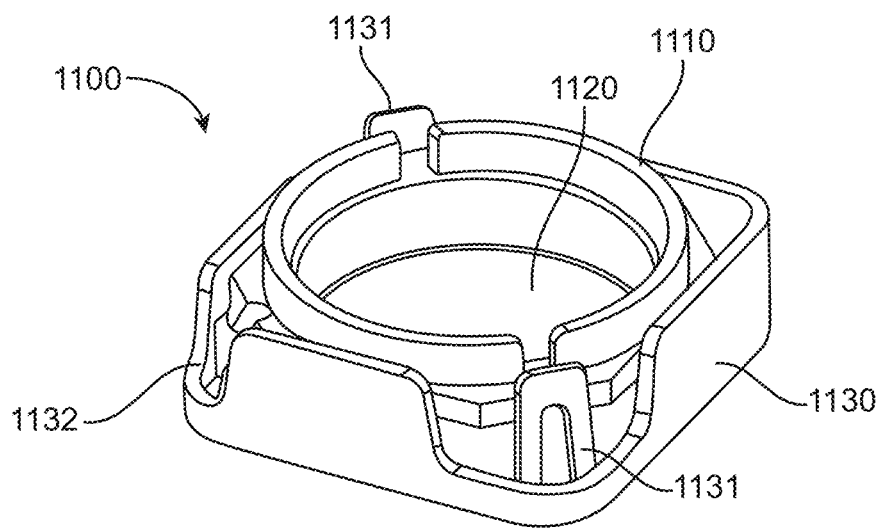
FIGS. 1A-1B show an embodiment of the loading assembly.

Unless defined otherwise, all technical and scientific terms used herein have the same meaning as is commonly understood by one of ordinary skill in the art.

The terminology used herein is for the purpose of describing particular embodiments only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof as used herein mean "comprising".

The term "about" or "approximately" can mean within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, within 5-fold, and more preferably within 2-fold, of a value. Where particular values are described in the application and claims, unless otherwise stated the term "about" meaning within an acceptable error range for the particular value should be assumed. For example, the amount "about 10" includes amounts from 8 to 12.

The term "substantially" as used herein can refer to a value approaching 100% of a given value. In some embodiments, the term can refer to an amount that may be at least about 90%, 91%, 92%, 93%, 94%, 95%, 96%, 97%, 98%, 99%, 99.9%, or 99.99% of a total amount. In some embodiments, the term can refer to an amount that may be about 100% of a total amount.

Cellular Cassette

Disclosed herein are cellular cassette devices, systems, and kits for the collection, storage, and/or analysis of biological samples and methods of using the same. In some embodiments, disclosed herein are cassettes for collecting, storing, or analyzing bioparticles. The cassette (e.g., cassette 1000 described herein) can comprise a plunger assembly, a membrane assembly, a loading assembly, or any combination thereof. The cassette can comprise a plunger assembly, a membrane assembly, and a loading assembly. The cassette can comprise a membrane such as a semi-permeable membrane and a loading assembly. The cassette can comprise a membrane such as a semi-permeable membrane and a microwell array.

In some cases, a cassette can further comprise a locking mechanism. In some cases, the locking mechanism is configured to lock a plunger and a membrane assembly in place with a loading assembly. In some cases, the locking mechanism is configured to lock a membrane assembly in place with a loading assembly. The locking mechanism can take any suitable form, for example, mechanical, magnetic, and chemical. In some embodiments, the locking mechanism utilizes a mechanical means, such as a snap trap. In some embodiments, the locking mechanism utilizes magnetic force. In some embodiments, the locking mechanism utilizes adhesives. In some embodiments, the locking mechanism comprises threads on one or more locking members. In the locking mechanism comprises friction fit. In some embodiments, the locking mechanism utilizes a cassette clamp or other devices that operates to hold the various parts of the cassettes together. Accordingly, the cassette can be in a locked format or in an unlocked format. In some embodiments, the locking mechanism is reversible, i.e., the lock can be engaged or disengaged reversibly. In other embodiments, the locking mechanism is irreversible.

A locking mechanism described herein can comprise one or more locking members. In some embodiments, the locking mechanism comprises a top locking member and a bottom locking member. In some embodiments, the locking mechanism comprises one or more top locking members and one or more bottom locking members. In some embodiments, a plunger assembly comprises a top locking member that functions to maintain the position of the plunger assembly in place with the membrane assembly, the loading assembly, or both. In some embodiments, a membrane assembly comprises a top locking member that functions to maintain the position of the membrane assembly in place with the loading assembly. In some embodiments, a membrane assembly comprises a bottom locking member that functions to maintain the position of the membrane assembly in place with the plunger assembly. In some embodiments, a loading assembly comprises a bottom locking member that functions to maintain the position of the loading assembly in place with the membrane assembly, the plunger assembly, or both.

In some embodiments, disclosed herein is a cassette for collecting, storing, or analyzing bioparticles, said cassette comprises: (a) a plunger that comprises a top surface and a bottom surface; (b) a membrane assembly that comprises: (i) a semi-permeable membrane that comprises a membrane top surface and a membrane bottom surface, and (ii) a membrane frame configured to attach to said plunger, wherein said semi-permeable membrane is attached to said membrane frame, and wherein said membrane assembly is configured to allow at least a portion of said bottom surface of said plunger to be in contact with said membrane top surface when said membrane frame is attached to said plunger; (c) a loading assembly that comprises a base and a microwell array, wherein said microwell array comprises a top surface and a plurality of microwells, wherein said loading assembly is configured to allow at least a portion of said top surface of said microwell array to be in contact with said membrane bottom surface, and wherein said contact is capable of retaining one or more bioparticles in said microwell array. In some embodiments, disclosed herein is a cassette for collecting and/or analyzing bioparticles, said cassette comprises: (a) a plunger that comprises a top surface, a bottom surface, and a top locking member; (b) a membrane assembly that comprises: (i) a semi-permeable membrane that comprises a membrane top surface and a membrane bottom surface, and (ii) a membrane frame configured to reversibly attach to said plunger, wherein said semi-permeable membrane is attached to said membrane frame, and wherein said membrane assembly is configured to allow at least a portion of said bottom surface of said plunger to be in contact with said membrane top surface when said membrane frame is attached to said plunger; (b) a loading assembly that comprises: (i) a base that comprises a bottom locking member and one or more ports, and (ii) a microwell array bonded to said base, wherein said microwell array comprises a top surface and a plurality of microwells, wherein said bottom locking member is configured to engage with said top locking member, thereby maintaining a contact between at least a portion of said membrane bottom surface and at least a portion of said top surface of said microwell array, and wherein said one or more ports are configured to allow liquid removal when said top locking member is engaged with said bottom locking member.

Figure 8:
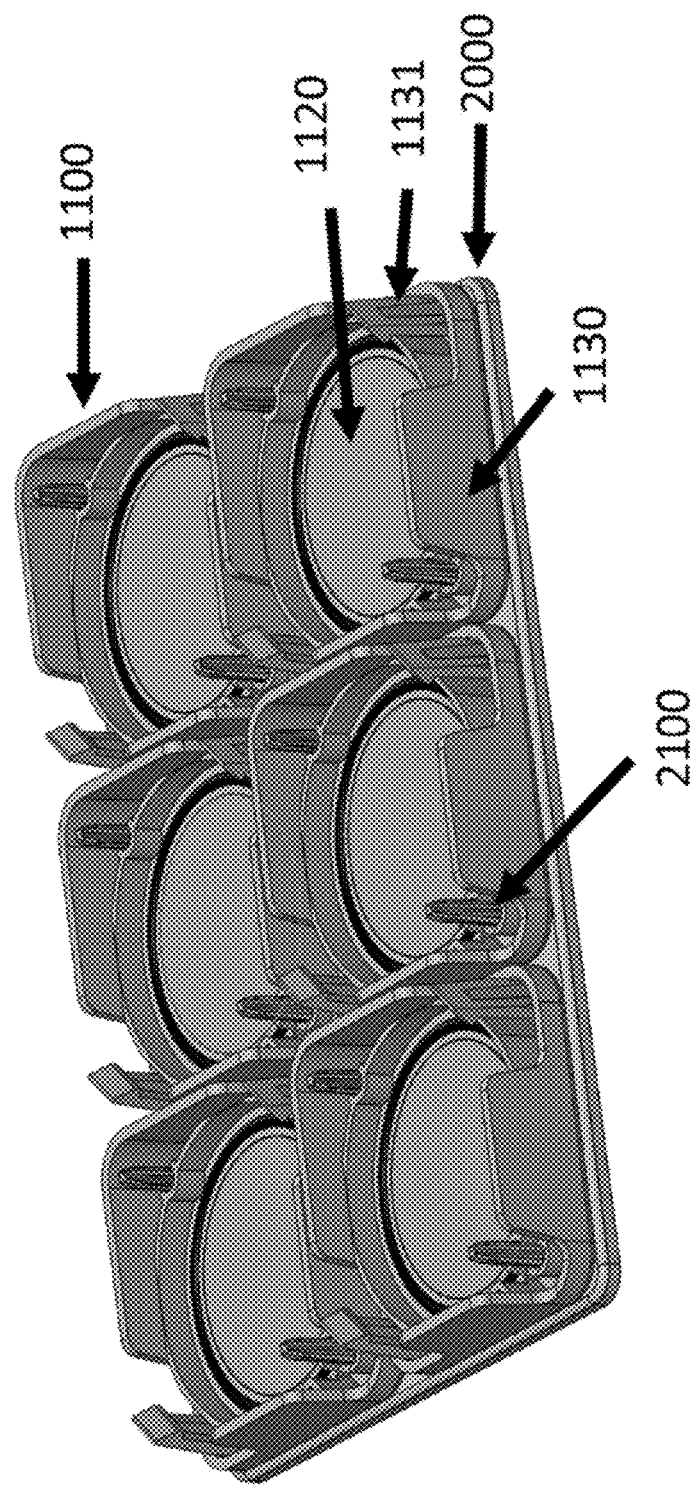
FIG. 8 shows a perspective view of opened cassettes on a SBS frame with membrane assembly removed, illustrating the SBS frame, the keys on the SBS frame, the loading assembly, the base of the loading assembly, the snap clips, and the microarray. Multiple appearances of the same components are only labeled once in FIG. 8.

The cellular cassette can have a variety of use mode. For example, the cassette can have a sample loading mode, where the microwells are exposed and sample can be loaded. For another example, the cassette can have a storage and shipping mode, where the cassette is closed thus protecting the samples within the cassette. The cassette can be stored and/or shipped individually or on an SBS frame, where multiple cassettes are stored and/or shipped together. The cassette can have a sample processing mode, where the samples within the microwells can be processed. One exemplary embodiment of the processing mode is illustrated in FIG. 8, where the backside of the membrane is exposed and buffers or reagents can be added to the sample. The cassette can have a sample collection mode, where the bioparticles and/or beads can be aggregated. In some embodiments of the sample collection mode, the membrane is released from the microwells.

In some embodiments, the cassette comprises: a membrane assembly, a loading assembly that comprises a plurality of microwells, a plurality of beads, and a plurality of cells, wherein at least 80%, 90%, 95%, 98%, or 99% of the cells are loaded in the microwells as a single cell. In some embodiments, the cassette comprises: a membrane assembly, a loading assembly that comprises a plurality of microwells, a plurality of beads, and a plurality of lysed cells. In some embodiments, the cassette comprises: a membrane assembly, a loading assembly that comprises a plurality of microwells, and a plurality of beads, wherein at least some of the beads comprise captured RNA molecules. In some embodiments, the captured RNA molecules originate from the cell that is resident in the same microwell as the bead. In some embodiments, at least a portion of the cells or beads are retained in the microwells by a membrane that is reversibly attached to the microwells.

A cassette described herein can take any external shapes. In some embodiments, the cassette has a cylinder shape. In some embodiments, the cassette has a cuboid shape. In some embodiments, the cassette has a cube shape. In some embodiments, the cassette is square when viewed from the top.

Plunger Assembly

In some cases, a cassette comprises a plunger assembly that comprises a plunger. When attached the membrane assembly, the plunger can provide support to the membrane and protect the membrane while it is being applied to the microwell array. The plunger can also provide pressure that facilitates the bonding between the membrane of the membrane assembly and the microwell array. The plunger assembly can comprise a top surface. In some embodiments, the top surface of the plunger assembly (i.e., plunger top surface or plunger flange) is rigid. The top surface of the plunger assembly can be substantially flat so as to enable the vertical stacking of two or more cassettes. In some cases, the top surface of the plunger assembly comprises a handle. The plunger top surface can be of any suitable shape; for example, it can comprise a circle, a square, a diamond, a rectangle, a hexagon, etc. In some embodiments, the plunger comprises a bottom surface (i.e., plunger bottom surface). In some embodiments, the plunger bottom surface is rigid. In some embodiments, the plunger bottom surface comprises an elastomeric surface. In some embodiments, the plunger bottom surface is elastomeric. In some cases, the bottom surface of the plunger is substantially flat. In some cases, the bottom surface of the plunger comprises a curved surface. In some specific embodiments, the bottom surface of the plunger comprises a convex surface. The plunger bottom surface can be of any suitable shape; for example, it can comprise a circle, a square, a diamond, a rectangle, etc. In some cases, the bottom surface of the plunger is circular or substantially circular. In some embodiments, the plunger comprises a side surface. In some embodiments, the plunger side surface comprises one or more cutouts. In some embodiments, the plunger side surface comprises cutouts in a vertical pattern, such as groves that runs vertically on the plunger.

The plunger can comprise a cylindrical shape. In some embodiments, the side of the cylinder-shaped part comprises one or more channels. The plunger can further comprise external side surfaces. The external side surfaces can comprise at least a part of the side surfaces of the cassette. In some cases, a plunger assembly comprises a top locking member. The top locking member can comprise a substantially vertical member that is configured to be snap-locked together with a bottom locking member. In some embodiment, the plunger comprises 1, 2, 3, 4 or more top locking members. In some embodiment, the plunger comprises two top locking members on the opposite side of the plunger.

Membrane Assembly

In some cases, a cassette described herein comprises a membrane assembly. The membrane assembly can comprise a membrane and a membrane frame. The membrane assembly can comprise a membrane and a membrane applicator that is not a membrane frame. The membrane assembly can be configured to attach to the loading assembly. In some cases, the membrane assembly is configured to reversibly attach to the loading assembly. The membrane assembly can be configured to attach to the plunger. In some cases, the membrane assembly is configured to reversibly attach to the plunger. The membrane assembly can further comprise a locking mechanism that secures it to the plunger, to the loading assembly, or both. In some embodiments, the membrane assembly comprises one or more top locking members. In some cases, the membrane assembly can comprise a substantially circular shape.

In some embodiments, the membrane is impermeable. In some embodiments, the membrane is semi-permeable. In some embodiments, a semi-permeable membrane is an ultra-filtration membrane or filtration membrane. The membrane can comprise a membrane top surface and a membrane bottom surface. The membrane top surface and bottom surface can independently comprise e.g., a circular, a square, a rectangle, a hexagon shape, or any other suitable shape. In some embodiments, the membrane top surface has substantially the same shape and size as the plunger bottom surface.

A semi-permeable membrane described herein can be configured to allow an object of interest to pass through the membrane or to retain an object of interest. In some embodiments, the semi-permeable membrane is configured to retain one or more beads. In some embodiments, the semi-permeable membrane is configured to retain one or more bioparticles. In some embodiments, the semi-permeable membrane is configured to retain a cell, a genome, a nucleic acid, a virus, a nucleus, a protein, or a peptide. In some embodiments, the semi-permeable membrane is configured to allow a genome, a nucleic acid, a virus, a nucleus, a protein, or a peptide to pass through the membrane. In some embodiments, the semi-permeable membrane comprises an average pore diameter of at least 1 nm, at least 10 nm, at least 20 nm, at least 30 nm, at least 40 nm, at least 50 nm, at least 75 nm, at least 100 nm, at least 200 nm, at least 300 nm, at least 400 nm, at least 500 nm, at least 600 nm, at least 700 nm, at least 800 nm, at least 900 nm, or at least 1000 nm. In some embodiments, the semi-permeable membrane comprises an average pore diameter of at most 20 nm, at most 30 nm, at most 40 nm, at most 50 nm, at most 75 nm, at most 100 nm, at most 200 nm, at most 300 nm, at most 400 nm, at most 500 nm, at most 600 nm, at most 700 nm, at most 800 nm, at most 900 nm, at most 1 µm, at most 2 µm, at most 3 µm, at most 5 µm, or at most 10 µm. In some embodiments, the semi-permeable membrane comprises an average pore diameter of from about 1 nm to about 200 nm. In some embodiments, the semi-permeable membrane comprises an average pore diameter of from about 1 to 200 nm, 15 to 150 nm, 25 to 100 nm, or 25 to 75 nm. In some embodiments, a semi-permeable membrane described herein has an average pore size in a range of 0.001 to 0.25 times a largest lateral dimension of a cell and/or bead. In some embodiments, the semi-permeable membrane has an average pore size in a range of 0.001 to 0.1 times a largest lateral dimension of a cell. In some embodiments, the semi-permeable membrane comprises an average pore size in a range of 0.001 to 0.1 times a largest lateral dimension of a bead. In some embodiments, the semi-permeable membrane comprises an average pore diameter in a range of 1 nm and 200 nm.

In some embodiments, at least a portion of the membrane bottom surface is functionalized. A functionalized surface can facilitate the attachment between the membrane bottom surface and the microwell array. A method of making and using functionalized surfaces and semi-permeable array can be referred to in, e.g., US 2019/0144936A1, which is hereby incorporated by reference in its entirety. In some cases, the membrane bottom surface comprises one or more reactive functional groups. In some cases, the reactive functional group can comprise an amine, an aminosilane, a thiosilane, a methacrylate silane, a poly(allylamine), a maleimide, a 2-iminothiolane, a functional group derived from polyacrylic acid or bisepoxy-PEG, or a combination thereof. In some embodiments, the membrane bottom surface bears a charge.

In some embodiments, the back side of the membrane (i.e., top membrane surface) is accessible after the membrane assembly is attached to the loading assembly. Such access to the back side of the membrane can be provided by any suitable means. For example, in some embodiments, the plunger is removable from the membrane assembly, thus exposing the back side of the membrane. For another example, in some embodiments, such access is provided by an opening on the plunger top and/or bottom surfaces.

In some embodiments, the membrane assembly comprises a membrane (e.g., semi-permeable membrane) attached to the membrane frame. In some embodiments, the membrane is bonded to the membrane frame. In some embodiments, the membrane is reversibly attached to the membrane frame. The membrane frame can be rigid and it also can comprise elastomeric materials or surfaces. In some cases, the cassette comprises a membrane frame configured to attach to the plunger. The membrane frame can be reversibly attached to the plunger. For example, in some embodiments, the membrane frame can be snapped onto the plunger. In some embodiments, the membrane assembly is pre-attached to the plunger.

The membrane assembly can be configured to allow at least a portion of the bottom surface of the plunger to be in contact with the membrane top surface when the membrane assembly is attached to the plunger. In some embodiments, the contact between the plunger bottom surface and the membrane top surface provides support for the membrane while it is being attached to the microwell array. In some cases, a membrane can attach to a rigid surface. In some cases, a surface can comprise a frame instead of a full slide, wherein a frame can be permanently bonded to a membrane. In some cases, a frame or other surface can reversibly attach to a plunger to create a single piece to apply and provide force for sealing a membrane to an array. In some cases, a plunger can push on a membrane through a membrane frame or other surface, to which the membrane is attached. In some cases, the membrane frame or other surface, to which the membrane is attached, is configured to enable access to a backside of a membrane while it is sealed against an array to enable addition and diffusion of lysis, hybridization and enzymatic reactions through a membrane into wells while a membrane is still attached to a frame. In some cases, the membrane frame or other surface, to which the membrane is attached, can enable easy removal of a membrane when bead access is necessary by pulling on a frame instead of trying to grab a flimsy membrane.

In some embodiments, a membrane assembly described herein contacts at least a portion of the plunger (e.g., the bottom surface of the plunger) directly. In some embodiments, a membrane assembly described herein contacts at least a portion of the plunger through a medium. In some embodiments, a membrane assembly described herein does not directly contact the plunger when the membrane assembly is attached to the plunger. The plunger can provide support for the membrane through a medium. Accordingly, in some embodiments of a cassette described herein, the cassette comprises a medium between the plunger and the membrane. The medium can function as a fluid reservoir. In some embodiments, the medium comprises a sheet that comprises an absorbent material. Exemplary adsorbent materials include, but are not limited to, paper (such as filter paper and tissue paper), superabsorbent polymers (e.g., polyacrylic acid, polyacrylamide, ethylene maleic anhydride copolymer, carboxymethylcellulose, polyvinyl alcohol, polyethylene oxide, polyacrylonitrile, polysaccharide, or a copolymer that comprises any of the above polymers), hydrogels, and porous materials such as sponge. In some embodiments, the medium comprises a layer of paper or superabsorbent polymer. The medium can comprises a buffer or a solution, e.g., a cell preservation solution such as RNALater or vivoPHIX.

In some embodiments, a cassette described herein comprises a fluid reservoir between the plunger and the membrane. The fluid reservoir can comprise a solution and an adsorbent material. The fluid reservoir can be inserted between a semi-permeable membrane and a plunger when these pieces are clicked together such that the solution in the reservoir can permeate the pores of the membrane. The reservoir can take the form of an absorbent material such as filter paper that can be saturated with the desired solution. Upon application of the membrane and plunger component to the array, the solution contained in the reservoir diffuses through the membrane and mixes with the solution in the wells. A common solution that can be applied in this way is a cell preservation solution such as RNALater or vivoPHIX. In some embodiments, the fluid reservoir has a thickness of about 5 nm to about 5 mm. In some embodiments, the fluid reservoir has a thickness within a range of from about 1 nm, 5 nm, 25 nm, 50 nm, or 100 nm to about 500 nm, about 1 µm, about 5 µm, about 25 µm, about 50 µm, about 500 µm, or about 1 mm. In some embodiments, the fluid reservoir has a thickness of about 50 nm to about 500 nm, about 100 nm to about 1 µm, about 1 µm to about 100 µm, about 50 µm to about 500 µm, or about 100 µm to about 1 mm.

Loading Assembly

A cassette described herein can comprise a loading assembly. In some embodiments, the loading assembly comprises a microwell array. In some embodiments, the loading assembly comprises a microwell. In some embodiments, the loading assembly comprises a base, to which the microwell array is attached to. In some cases, a cassette comprises a loading assembly that comprises a base and a microwell array. In some embodiments, the loading assembly can be configured to allow at least a portion of the top surface of the microwell array to be in contact with a membrane bottom surface. The contact between the microwell array and the membrane bottom surface can seal the contacted portion of the microwells and thus is capable of retaining one or more bioparticles in the microwell array.

A microwell array (or array) can comprise a plurality of microwells (or wells). In some cases, the microwell array comprises from about 1000 to about 1,000,000 microwells. In some cases, the microwell array comprises from about 5000 to about 1,000,000 microwells. In some cases, the microwell array comprises from about 50,000 to about 150,000 microwells. In some specific embodiments, the microwell array comprises about 50,000, about 55,000, about 60,000, about 65,000, about 70,000, about 75,000, about 80,000, about 85,000, about 90,000, about 95,000, about 100,000, about 105,000, about 110,000, about 115,000, about 120,0000, about 130,000, about 140,000, or about 50,000 microwells. In some embodiments, a microwell array comprise one or more microwells. The microwells can be arranged in any pattern. In some embodiments, the microwells are arranged in a hexagonal pattern.

A microwell can have a volume in the picoliter range, including volumes ranging from less than 1 picoliter to about 10,000 picoliters. The range can be from about 1 picoliter to about 1000 picoliters, or about 5 picoliters to about 1000 picoliters, or about 10 picoliters to about 500 picoliters, or about 50 picoliters to about 125 picoliters. A microwell can have dimensions (e.g., x and y or diameter, and height dimensions) in the micron ranges. For example, a microwell can have dimensions of about 45 microns (x) by about 45 microns (y) by about 60 microns (h) and have a rectangular volume, or they may have dimensions of about 50 microns (x) by about 50 microns (y) by about 50 (h) microns and have a cube volume. The microwell can have cross-sectional area (from a top-down perspective) that is square, hexagon, circular, oval, etc.

A microwell array described herein can comprise a top surface, where the openings of the microwells are located. In some embodiments, the top surface of a microwell array comprises microwells displaced therein. In some embodiments, an average diameter of the microwells on the top surface is at most 1000 microns, at most 500 microns, at most 400 microns, at most 300 microns, at most 200 microns, at most 100 microns, at most 75 microns, at most 50 microns, at most 40 microns, at most 30 microns, at most 20 microns, at most 10 microns, or at most 5 microns. In some embodiments, an average diameter of the microwells on the top surface is at least 5 microns, at least 7 microns, at least 10 microns, at least 20 microns, at least 30 microns, at least 45 microns, at least 50 microns, or at least 100 microns. In some embodiments, an average diameter of the microwells on the top surface is from about 5 microns to about 50 microns. In some embodiments, a microwell is configured to hold an object of interest, e.g., a bead, a cell, a fragment of a tissue, etc.

A microwell array described herein can comprise a bottom surface. In some embodiments, the bottom surface is impermeable. In some embodiments, the bottom surface is permeable or semi-permeable. In some embodiments, the bottom surface of the microwell array comprises a semi-permeable membrane. A semi-permeable bottom surface allows a solution to diffuse to the wells through the bottom of the array. In some embodiments, a microwell array comprises an impermeable bottom surface and the membrane of the membrane assembly is permeable or semi-permeable, which allows a solution to diffuse from the top of the microwell array. In some embodiments, a microwell array comprises a semi-permeable bottom surface and the membrane of the membrane assembly is impermeable, which allows a solution to diffuse from the bottom of the microwell array. In some embodiments, a microwell array comprises a semi-permeable bottom surface and the membrane of the membrane assembly is also semi-permeable, which allows a solution to diffuse from the top and the bottom of the microwell array. In some embodiments, a microwell array comprises an impermeable bottom surface and the membrane of the membrane assembly is also impermeable, which substantially prevents a solution from diffusing out of the microwell array. In some embodiments, the membrane of the membrane assembly, or a portion thereof, is bonded to the top surface of the microwell array.

The microwells can comprise any suitable shape and geometry; for example, they can be cylindrical, cuboid, conical, etc. In some cases, the microwells comprise a uniform depth in a range of 5 microns to 500 microns. In some cases, the microwells are cylindrical and have a uniform diameter in a range of 1 micron to 500 microns (e.g., 15-100 microns or 1-10 microns). In some cases, the microwells are cuboid and have a uniform largest lateral length in a range of 1 micron-500 microns (e.g., 15-100 microns or 1-10 microns). In some cases, the microwells are conical and have a uniform diameter in a range of 35 microns to 100 microns at a top surface and can have a uniform diameter in a range of 0.5 microns to 3 microns at a bottom surface. In some cases, the microwells have a uniform depth in a range of 30 microns to 100 microns. In some cases, the microwells have a largest lateral dimension in a range of 1 to 6 times that of the largest lateral dimension of a cell and/or a bead. In some cases, the microwells have a largest lateral dimension in a range of 1 to 6 times the largest lateral dimension of a cell. In some cases, the microwells have a largest lateral dimension in a range of 1 to 6 times the largest lateral dimension of a bead. In some cases, a total lateral area of microwells at the top surface of the microwell array can comprise at least 10% of the total lateral area of the array. In some cases, the microwells have a uniform diameter in a range of 1 micron to 10 microns. In some cases, the microwells have a uniform diameter in a range of 15 microns to 100 microns. In some cases, each of the microwells can comprise one or more cells.

In some embodiments, the microwell array comprises spatial barcodes. The spatial barcodes can be located inside the microwells such as on an interior surface of the microwells or on a bead that is resident in the microwells. In some embodiments, each of the spatial barcodes is unique. In some embodiments, the array comprises unique spatial barcodes that are unique to each of the microwells or to each cluster of microwells. In some embodiments, the location of each spatial barcode in the microwell array is known. In some embodiments, the spatial barcodes are located at the bottom surfaces of the microwells.

The interior surface of the microwells can be functionalized. In some embodiments, each microwell comprises a functionalized surface that comprises one or more nucleic acid molecules having a unique spatial barcode. In some embodiments, each unique spatial barcode is unique to one or a cluster of wells. In some embodiments, each well contains a unique combination of spatial barcodes. In some embodiments, each unique spatial barcode is co-delivered with a unique stimulus. In some embodiments, the location of each spatial barcode on the array of wells is known.

The microwell array can comprise one or more cutouts. The one or more cutouts can be used to direct pipetting. The one or more cutouts can be used to recover the beads, e.g., from the collection device. The one or more cut-outs can be independently located anywhere on the array. In some cases, a microwell array described herein comprises a cutout located at the center of an array. In some cases, a microwell array described herein comprises a cutout located on the side of the array. In some cases, a microwell array described herein comprises a cutout located at the center of the array and a cutout located on the side of the array.

The top surface of a herein-described microwell array can be functionalized. In some embodiments, the top surface of the microwell array comprises one or more functional groups such as reactive functional groups. In some embodiments, the reactive functional groups comprise an amine, an aminosilane, a thiosilane, a methacrylate silane, a poly (allylamine), poly(lysine), BSA, epoxide silane, chitosan, 2-iminothiolane, a functional group derived from polyacrylic acid, bisepoxy-PEG, or oxidized agarose, or a combination thereof. The microwell array can comprise glass or a polymer material, for example, poly-dimethylsiloxane (PDMS), polycarbonate (PC), polystyrene (PS), polymethyl-methacrylate (PMMA), PVDF, polyvinylchloride (PVC), polypropylene (PP), cyclic olefin co-polymer (COC), and silicon. In some embodiments, the top surface of the array comprises functional groups conjugated to cyclic olefin co-polymer using aryl diazonium salts. In some embodiments, the top surface of the array bears a charge. In some embodiments, the top surface of the array bears a charge that is opposite to the charge bore on the membrane bottom surface.

The top surface of a herein-described microwell array can be bonded with the membrane bottom surface, thereby substantially isolating at least a portion of the microwells. In some embodiments, at least 80%, at least 85%, at least 90%, at least 95%, at least 99%, or at least 99.9% of the top surface of the microwells is bonded with the membrane, thereby sealing the microwells under the bonded membrane. In some embodiments, at least 80%, at least 85%, at least 90%, at least 95%, at least 99%, or at least 99.9% of the microwells is sealed with the membrane. A person skilled in the art would appreciate that in the case of a permeable or semi-permeable membrane, objects that are able to pass through the membrane can diffuse or otherwise leave the sealed microwell through the membrane side.

The bonding between the top surface of the microwell array and the membrane bottom surface can be provided by physical or chemical force. For example, the bonding can be achieved by applying pressure, such as through a clamp. In some embodiments, the bonding is provided by a molecular bonding, such as through a chemical reaction of the functional groups. For example, the functional groups on the top surface of the array and the functional groups on the membrane bottom surface can react and thus bond with each other. A certain amount of pressure can be required to form the molecule bonding. In some embodiments, the pressure provided by the locking mechanism (e.g., the engagement between the top locking member(s) and the bottom locking member(s)) is sufficient to provide the pressure for molecule bonding. A period of time of contact can be necessary to form the molecule bonding. In some embodiments, the period of time required to form the molecular bonding is at least 5 seconds, at least 30 seconds, at least 1 minute, at least 5 minutes, at least 10 minutes, at least 15 minutes, at least 20 minutes, at least 30 minutes, at least 45 minutes, or at least 1 hour. In some embodiments, the period of time required is at most 2 hours, at most 1 hour, at most 45 minutes, at most 30 minutes, at most 15 minutes, at most 10 minutes, at most 5 minutes, or at most 1 minute. In some embodiments, the period of time required to form the molecular bonding is about 1 minute to about 30 minutes. In some embodiments, the period of time required to form the molecular bonding is about 2 minute to about 15 minutes. In some embodiments, the formation of the bonding between the top surface of the microwell array and the membrane bottom surface requires heating. For example, in some embodiments, the bonding between the top surface of the microwell array and the membrane bottom surface is formed at about 30° C., about 40° C., about 50° C., about 60° C., or about 75° C. or above. In some embodiments, the formation of the bonding between the top surface of the microwell array and the membrane bottom surface does not require heating.

A microwell array described herein can be situated on or in a base of the loading assembly. The microwell array can be bonded to the base, or it can be part of the base. In some embodiments, the microwell array is reversibly attached to the base. In some cases, the base is rigid. In some cases, the base comprises a bottom locking member that can be configured to engage the top locking member. The base can comprise 1, 2, 3, 4, or more bottom locking members. In some embodiments, the base comprises two bottom locking members. In some embodiments, the two bottom locking members are situated on the opposing corners of the base. In some embodiments, the two bottom locking members are not located on the same edge of the base. In some embodiments, the bottom locking member is substantially vertical. The bottom locking member can be configured to engage a top locking member through a snap trap mechanism. In some cases, the contact between the microwell array and the membrane bottom surface can be maintained by engaging a top locking member and a bottom locking member, e.g. a trap snap. The trap snap design can prevent the opening of the cassette without a key. The trap snap design can also ensure cassettes and contained samples are safe for shipping and storage.

In some cases, the base comprises one or more key holes configured to allow the insertion of one or more keys. The insertion of the one or more keys can disengage the locking mechanism, e.g., disengaging the top locking member and the bottom locking member. In some cases, the insertion of the keys releases the plunger assembly from the loading assembly. In some cases, the insertion of the keys releases the plunger assembly from the loading assembly and the membrane assembly. In some cases, the insertion of the keys releases the plunger from the loading assembly while leaving the membrane assembly attached to the loading assembly. In some cases, the insertion of the keys releases the plunger from the loading assembly while leaving the membrane assembly attached to the plunger assembly.

In some cases, the base comprises a recessed area relative to the microwell array (e.g., the recessed area 1133 described herein). The recessed area can be used to accommodate excess fluid, e.g., the fluid retained by a loading ring. In some cases, the base comprises one or more ports configured to allow liquid removal. In some embodiments, the base comprises 1, 2, 3, 4 or more ports configured for fluid collection. In some embodiments, the base comprises one port. The one or more ports can be located in any suitable location of the base. For example, the excess fluid can be pipetted away through the one or more ports. In some cases, the base comprises one port. In some cases, the one or more ports are situated on the side of the base. In some cases, the one or more ports are situated at the bottom of the base. In some cases, the base further comprises one or more channels that are capable of facilitating a fluid flow from the recessed area to the one or more ports.

The loading assembly can comprise an elevated loading ring surrounding the microwell array surface area. The loading ring can function to retain excess fluid on the microwell array. In some cases, the loading ring is configured to retain fluid on the microwell array. For example, the loading ring can be configured to retain from about 0.1 ml to about 5 ml fluids. In some embodiments, the loading ring is configured to retain from about 0.25 to about 2 ml fluid, from about 0.5 to 1.5 ml fluid, or from about 0.75 to about 1.25 ml fluid. In some embodiments, the loading ring is configured to retain about 1 ml fluid. In some cases, the loading ring comprises a hydrophobic inward-facing surface. In some embodiments, the loading ring is hydrophobic. The hydrophobic ring (or surface) can hold bulk sample solution over an array area with minimal meniscus to ensure uniform loading of bioparticles across the array.

In some cases, the loading ring is part of the base. In some cases, the loading ring can be reversibly attachable to the base. The reversibly attachable loading ring can have the same geometry as the membrane frame. In some embodiments, the loading has substantially the same configuration as the membrane frame.

A loading assembly described herein can comprise an injection lid that covers at least a portion of the microwell array. In some embodiments, the injection lid covers at least 25%, 50%, 75%, 80%, 60%, 90%, 95%, 99%, or 100% of the microwell array. In some embodiments, the injection lid fully covers the microwell array. In some embodiments, the injection lid does not fully cover the microwell array. In some embodiments, a loading assembly comprises either an injection lid or a loading ring. In some embodiments, a loading assembly comprises an injection lid but not a loading ring. In some embodiments, a loading assembly comprises a loading ring but not an injection lid. In some embodiments, the loading assembly lacks an injection lid. In some cases, the loading ring comprises an injection lid that covers the microwell array. The lid can comprise one or more openings. The one or more openings on the lid can be used to direct pipetting. In some embodiments, the lid is a flip top lip that attaches or is connected with the loading assembly. In some embodiments, the lid is a snap lid. In some embodiments, the lid fits onto the loading assembly by friction. In some embodiments, the lid has threads that engage with thread on the loading ring.

Bioparticles and Beads

The microwell array can comprise a plurality of beads such as capture beads. In some cases, one or more microwells of the array comprise a single bead. In some cases, at least 80%, 85%, 90%, 95%, 99%, 99.9%, or 100% of microwells in the array comprise a single bead. In some embodiments, less than 10%, 5%, 4%, 3%, 2%, or 1% of the microwells comprise two or more beads. In some cases, beads are pre-loaded into the microwells. In some cases, beads are loaded into the microwells before or after the bioparticles are loaded. In some embodiments, beads and bioparticles are loaded simultaneously. The microwell array can be configured to hold one or more beads. In some embodiments, each of the microwells is configured to hold a single bead. The semi-permeable membrane can be configured to retain the beads such that the beads cannot pass through the membrane pores. The size of the capture beads can be dictated by the size of the microwells that are used. In some embodiments, the size of the bead will be chosen such that only one bead can occupy a microwell at a single time. Alternatively, the dimensions of the microwells can be chosen such that only one bead occupies a microwell at a single time. In some embodiments, the capture beads have an average diameter that is about 1 µm, about 5 µm, about 10 µm, about 15 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 90 µm, about 100 µm, about 110 µm, about 120 µm, about 150 µm, or about 200 µm. In some embodiments, the beads are from about 10 µm-50 µm in diameter. In some embodiments, the beads are about 35 microns in diameter. In some embodiments, the beads are magnetic.

As described herein, a capture bead can comprise a bead having a capture oligonucleotide attached to its surface, which comprises a capture domain, site or sequence for annealing to target nucleic acids such as target transcripts. When the target nucleic acids are transcripts then the bead can be referred to as a "transcript-capture bead". In some embodiments, the transcript capture bead has a poly(dT) capture sequence for annealing to the poly(dA) tail of mRNA transcripts. In some embodiments, the capture oligonucleotide further comprises a barcode. The barcode can be used for labeling captured nucleic acids from a single cell, including all or a portion of captured transcripts of a single cell. In some embodiments, transcripts of a single cell are captured when the transcript capture bead and the single cell are placed in the same microwell and the cell is lysed. The barcode can be used to label nucleic acids from a single cell or a single microwell. The barcode can also be used to label nucleic acids from a plurality of cells or a plurality of microwells. In some embodiments, a barcode identifies a nucleic acid or a set of nucleic acids as being associated with a particular spatial location and/or with a particular treatment. In some embodiments, a barcode identifies a nucleic acid or a set of nucleic acids as being associated with exposure to a particular stimulus. In some embodiments, a barcode comprises 3, 4, 5, 6, 7, 8, 9, 10, 11, 12, 13, 14, 15, 16, 17, 18, 19, 20, 21, 22, 23 24, 25, 26, 27, 28, 29, or 30 nucleotides. In some embodiments, a barcode comprises 3, 4, 5, 6, 7, 8, 9, 10, 11, 12, 13, 14, 15, or 16 nucleotides. In some embodiments, the capture sequence comprises about 5, 6, 7, 8, 9, 10, 11, 12, 13, 14, 15, 16, 17, 18, 19, 20, 25 or 30 nucleotides. In some embodiments, the capture oligonucleotide comprises about 10, 20, 30, 40, or 50 nucleotides.

A microwell array described herein can comprise one or more bioparticles. In some cases, one or more microwells of the array comprise a single bioparticle (e.g., a single cell or a single bead that comprises biomaterial). In some cases, at least 80%, 85%, 90%, 95%, 99%, 99.9%, or 100% of microwells in the array comprise a single bioparticle. In some cases, at least 100, 500, 1000, 5000, or 10,000 microwells in the array comprise a single bioparticle. In some cases, at least 500 or 1000 microwells in the array comprise a single bioparticle. In some embodiments, less than 10%, 5%, 4%, 3%, 2%, or 1% of the microwells comprise two or more bioparticles. In some embodiments, less than 1% of the microwells comprise two or more bioparticles. In some embodiments, less than 5% of the microwells comprise two or more bioparticles. In some embodiments, less than 10,000, 5000, 1000, 500, 100, 50, 25 or 10 microwells in the array comprise two or more bioparticles. In some specific embodiments, less than 2%, 1.5%, 1%, 0.5%, or 0.1% of the microwells comprise two or more bioparticles. The microwell array can be configured to hold one or more bioparticles. In some embodiments, each of the microwells is configured to hold a single bioparticle. The semi-permeable membrane can be configured to retain the bioparticles such that the bioparticles cannot pass through the membrane pores.

A bioparticle can refer to a particle that comprises biological materials. For example, a bioparticle can refer to a cell or a capture bead that has an RNA attached to it. The one or more bioparticles can comprise a cell, a genome, a nucleic acid, a virus, a nucleus, a protein, or a peptide. In some cases, the bioparticles comprise one or more cells. In some cases, the one or more cells comprise a bacteria cell, a plant cell, an animal cell, or a combination thereof. In some cases, the one or more cells comprise a mammalian cell. In some embodiments, the cells are bacterial cells. In some embodiments, the cells are eukaryotic cells. In some embodiments, the cells are prokaryotic cells. In some embodiments, the cells are murine cells. In some embodiments, the cells are primate cells. In some embodiments, the cells are human cells. In some embodiments, the cells are tumor cells. The cells (or nucleic acid source) may be naturally occurring or it may be non-naturally occurring. In some embodiments, the cells are healthy cells. In some embodiments, the cells are diseased cells.

In some embodiments, the cells are mammalian cells. The mammalian cells can comprise one or more blood cells such as white blood cell (e.g., monocytes, lymphocytes, neutrophils, eosinophils, basophils, and macrophages), red blood cell (erythrocytes), or platelet.

Cellular Cassette System

Disclosed herein are systems comprising one or more herein described cassettes. The system can comprise a cassette frame configured to hold one or more cassettes. In some embodiments, the cassette frame is a Society for Biomolecular Screening (SBS) standard-sized frame. The system can further comprise one or more keys that are capable of disengaging the locking mechanism. In some embodiments, the keys are capable of releasing the plunger from the loading assembly.

In some cases, a cassette frame (such as SBS frame) can be designed to load multiple cassettes to enable multiplex processing. In some cases, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 cassettes can be loaded onto a cassette frame. In some embodiments, a cassette frame is configured to hold six cassettes. In some embodiments, a cassette frame is configured to hold twelve cassettes. In some embodiments, a cassette frame (such as SBS frame) comprises key holes that are configured to insert one or more keys. In some cases, the one or more keys can be built into an SBS frame.

The system can comprise from 1 to about 300 cassettes. In some cases, a system can comprise about 6, about 8, about 12, about 24, about 96, or about 120 cassettes. In some cases, at least two of one or more cassettes can be pre-connected. In some cases, all the cassettes on a SBS frame are pre-connected. In some cases, arrays can be pre-connected. In some cases, arrays can be made as multi-array systems fitting a standard SBS frame size. In some cases, a cassette frame can be built with trap snap keys built in to enable opening of a cassette as a cassette is loaded onto a cassette frame. In some cases, a key can also act as a snap to hold a cassette base to a cassette frame.

A key that disengages a locking mechanism of the described cassette can be of any suitable shape. In some embodiments, the key has a cross section that comprises a cross sign shape. In some embodiments, the key has a cross section that comprises a square, a hexagon, a slotted, a tri-wing, or a T-shape.

In some cases, a system can comprise one or more bioparticle collection units. In some cases, a collection unit can comprise one or more collection plates which can comprise a plurality of recesses. In some cases, a collection unit can comprise one or more conically-shaped cassette collectors. In some cases, a cassette collector can comprise a hole at the center that allows beads to pass through. In some cases, a cassette collector is configured to collect the bioparticles and/or beads from a single cassette. In some cases, a cassette collector is configured to collect the bioparticles and/or beads from multiple cassettes, e.g., all the cassettes on an SBS frame.

Cellular Cassette Kit

Also disclosed herein is a kit for collecting and/or analyzing bioparticles. In some cases, a kit comprises instructions for using the described cassettes and systems. In some cases, a kit can comprise one or more cassettes and one or more reagents. In some cases, one or more reagents can comprise a wetting solution, a wash fluid, a lysis buffer, a fixative, a tissue storage reagent, a storage buffer, a cell culture media, or a combination thereof. In some cases, a kit can comprise at least 1 cassette base with microwell array, a plunger, a membrane frame with membrane bonded to it, and any combination thereof. In some cases, a kit can further comprise a membrane frame pre-snapped to a plunger, an extra empty membrane frame to act as a cell loading ring, a cell injection lid to cover an array during cell loading, washing buffers, cell fixing solutions, an SBS plate with trap snap keys built in, and any combination thereof. In some cases a kit can comprise from about 1 to about 300 cassettes. In some case a kit can comprise about 6, about 8, about 12, about 24, about 96, or about 120 cassettes. The kit can further comprise instructions of using the kit or a component within the kit.

In some embodiments, the kit comprises a membrane applicator for applying a semi-permeable membrane to the array. In some cases, attachment of a semi-permeable membrane to an array surface can achieve optimal transcript capture. In some cases, a generalized form of an applicator consists of a membrane attached to a rigid backing of glass or acrylic plastic through a reversible chemistry, for example a hydrophilic thin film. In some cases, a thin film can comprise a salt bridge. In some cases, a thin film can comprise a hydrophilic polymer, which can enable a thicker film to be achieved. In some cases, a hydrophilic thin film can comprise a hydrophilic polymer such as polyacrylamide, poly(vinyl alcohol), agarose or alginate. In some cases, a reversible chemistry can comprise a disulfide bridge created by a biotin-streptavidin interaction which can be cleaved by a reducing agent. In some cases, a reversible chemistry can comprise a photosensitive linkage. In some cases, a reversible chemistry can comprise an enzymatically cleavable linkage.

In some cases, an applicator can solve a shipping problem as an activated membrane can be stable for extended periods adhered to a rigid backing in a dry state, which can enable shipping membranes in standard microscope slide containers. In some cases, a scalable production of individual membranes can enable use of a clear acrylic support and a thicker polymeric thin film. In some cases, using these materials, large, bulk applicators can be constructed. In some cases, acrylic backing can enable laser cutting of a bulk applicator into 100s of individual applicators. In some cases, thicker thin film can be required to prevent fusion of a membrane to an acrylic backing during laser cutting. In some cases, enabling detachment of a membrane during application. In some cases, an applicator can simplify attachment of a membrane to an array, as an entire applicator can be placed on top of an array as a single dry piece. In some cases, following clamping and incubation, an applicator: array sandwich can be submerged in a solution. In some cases, a hydrophilic thin film can absorb water. In some cases, releasing a membrane from an applicator and leaving a membrane attached to an array. In some cases, an applicator can negate a need for an end user to handle a flimsy membrane and perform an error-prone membrane attachment procedure. In some cases, a membrane applicator can be 20, 21, 22, 23, 24, 25, 26, 27, 28, 29, or 30 mm wide. In some cases, a membrane applicator can be 70, 71, 72, 73, 74, 75, 76, 77, 78, 79, or 80 mm long. In other cases, a membrane applicator can be much larger including for example 1-5 feet by 1-5 feet (e.g., 2 feet×2 feet, or 2 feet by 3 feet). In some cases, use of a larger applicator can enable sealing of a plurality of arrays simultaneously.

Also disclosed herein is a device comprising a membrane and a rigid support; wherein a membrane is attached to a rigid support through a reversible chemistry. In some cases, the rigid support can comprise glass. In some cases, the rigid support can comprise acrylic plastic. In some cases, the rigid support can comprise polycarbonate or polystyrene. In some cases, the rigid support can be about 1 to about 2 mm thick. In some cases, a membrane can comprise a semi-permeable membrane. In some cases, a membrane can be plasma-activated. In some cases, a membrane can comprise polycarbonate.

In some embodiments, the kit comprises a manual clamp. In some cases, a clamp comprises a three screw design. In some cases, a three screw design provides optimal pressure along a long axis of an array, preventing poor sealing at the ends of an array. In some cases, a square clamp can completely encompass an array holder and top piece and only touch an array holder underneath an array causing an upward force to be under an array. In some cases, a path can be allowed for fluid to leave an array surface. In some embodiments, the clamp is configured to apply pressure on one or more, such as 6, 12, and 24, cassettes at the same time.

In some embodiments, the kit comprises a crowding agent. A crowding agent can function to increase nucleic acid capture efficiency. The crowding agent can be a zwitterionic or neutrally charged agent. In some embodiments, the crowding agent does not interfere with the charge interaction between the membrane and the array. A non-limiting example of a crowding agent is polyethylene glycol (PEG). In some embodiments, the PEG has a number average molecular weight of at least 1000 Da. Other exemplary crowding agents include but are not limited to dextran, Ficoll, bovine serum albumin (BSA), and sucrose.

Methods of Use

Also disclosed herein is a method for collecting, storing, or analyzing bioparticles using a herein described cassette, system, or kit, or any combination thereof. Also disclosed herein is a method for collecting, storing, or analyzing bioparticles using a cellular cassette. Accordingly, in some embodiments, the described method is for sample collection. In some embodiments, the described method is for sample storage. In some embodiments, the described method is for sample processing. In some embodiments, described herein are cassettes, systems, and methods for asynchronous single-cell analysis. The methods can be used to generate barcoded, single-cell sequencing libraries. In some cases, a method can comprise: (a) loading a sample fluid that comprises one or more bioparticles onto a microwell array that can be situated on a base, wherein the microwell array can comprise a top surface and a plurality of microwells, thereby loading a bioparticle into at least one microwell; (b) applying a membrane assembly onto the microwell array, wherein the membrane assembly can be attached to a plunger, and wherein the membrane assembly comprises a membrane frame and a semi-permeable membrane that comprises a membrane top surface and a membrane bottom surface; (c) and contacting at least a portion of the top surface of the microwell array with at least a portion of the membrane bottom surface, and wherein the contact can retain at least one bioparticle in a microwell.

In some cases, the method can comprise attaching an elevated loading ring that surrounds a microwell array before a sample fluid is loaded. In some cases, the method can comprise wetting a microwell array before a sample fluid is loaded. The wetting process can comprise loading a wetting solution onto the microwell array. A suitable wetting solution can comprise, for example, alcohols such as ethanol, methanol, and propanol, and surfactants. The wetting process can further comprise removing the wetting solution from the microwell array. The wetting solution can be removed by washing, drying, pipetting, etc. In some embodiments, the wetting process comprises washing the microwell array with a wash buffer (e.g., PBS 0.1% BSA). In some embodiments, the wetting process comprises loading a wash buffer onto the microwell array and leaving the buffer on the microwell array for about 30 minutes to about 24 hours. In some embodiments, the wash buffer is left on the array overnight. In some cases, the wetting process comprises removing a wash buffer.

In some embodiments, the method comprises loading a sample fluid. In some embodiments, the method comprises contacting the microwell array with a sample fluid. In some embodiments, the method comprises contacting the microwell array with a tissue sample. The sample fluid can be loaded manually or by automation. In some embodiments, the sample fluid is loaded by pipetting. In some embodiments, the sample fluid is loaded by flowing a sample solution over the loading assembly. The loading of the sample fluid can be directed by the one or more cut-outs in the array, the opening(s) in the lid, or both. In some embodiments, the sample fluid is loaded to the cut-out area in the array. A suitable volume of the loaded sample fluid can depend on various factors, including but not limited to, the size of the array, the number and volume of the microwells in the array, the concentration of the sample fluid, etc. In some embodiments, the sample fluid comprises from about 0.1 ml to about 5 ml liquid. In some specific embodiments, the sample fluid comprises about 0.2 ml, about 0.3 ml, about 0.4 ml, about 0.5 ml, about 0.6 ml, about 0.7 ml, about 0.8 ml, about 0.9 ml, about 1.0 ml, about 1.1 ml, about 1.2 ml, about 1.3 ml, about 1.4 ml, about 1.5 ml, about 1.6 ml, about 1.7 ml, about 1.8 ml, about 1.9 ml, or about 2.0 ml fluid.

The sample fluid can comprise one or more bioparticles. In some embodiments, the sample fluid comprises a plurality of bioparticles. The bioparticles can exist in the sample fluid in various forms; for example, the bioparticles can be dissolved in the sample fluid, suspended in the sample fluid, or in micelles that are distributed in the sample fluid. In some specific embodiments, the sample fluid comprises a suspension of cells.

In some embodiments, the ratio of the number of bioparticles in the sample fluid to the number of microwells in the microwell array can be from about 1:1000 to about 10:1. In some cases, the ratio of the number of bioparticles in the sample fluid to the number of microwells in the microwell array can be from about 1:100 to about 1:1, from about 1:20 to about 1:4, or from about 1:10 to about 1:8. In some cases, the ratio of the number of bioparticles in the sample fluid to the number of microwells in the microwell array is from about 1:10 to about 1:8. In some embodiments, at least 50%, at least 60%, at least 70%, at least 80%, at least 90%, at least 91%, at least 92%, at least 93%, at least 94%, at least 95%, at least 96%, at least 97%, at least 98%, or at least 99% of bioparticles in the sample fluid are loaded in microwells. In some embodiments, at least 95% of bioparticles in the sample fluid are loaded in microwells.

After the sample fluid is loaded, one or more of the microwells can comprise one or bioparticles. In some embodiments, at least 0.5%, at least 1%, at least 2%, at least 5%, at least 10%, at least 15%, at least 20%, at least 30%, or at least 50% of the microwells comprise one or more bioparticles. In some embodiments, at least 0.5%, at least 1%, at least 2%, at least 5%, at least 10%, at least 15%, at least 20%, at least 30%, or at least 50% of the microwells comprise a single bioparticle. In some embodiments, from about 5% to about 20%, from about 5% to about 15%, or from about 8% to about 12% of the microwells comprise a single bioparticle. In some embodiments, the rest of the microwells are not occupied by any bioparticles. In some embodiments, less than 10%, less than 5%, less than 2%, or less than 1% of the microwells comprise two or more bioparticles.

In some embodiments, the method comprises mixing the loaded sample fluid. The mixing can be provided by agitating the loaded sample fluid, e.g., by pipetting one or more times. The mixing can be provided by swirling the loading assembly after the sample has been loaded. The mixing can also be provided by tilting the loading assembly. In some embodiments, the mixing comprises one or more means, such as agitating and swirling. In some specific embodiments, the method comprises agitating the loaded fluid by pipetting one or more times (such as 1-10 times). In some embodiments, the sample fluid is agitated at a cut-out at the center of the array.

In some cases, the method can further comprise incubating a loaded sample fluid. The sample fluid can be incubated before the mixing, after the mixing, or both. In some embodiments, the sample fluid is incubated statically before the mixing (e.g., agitation). In some embodiments, the sample fluid is incubated statically after the mixing. The sample fluid can be incubated for a period of time. In some embodiments, the incubation time is from about 30 seconds to about 12 hours, from about 1 minute to about 1 hour, or from about 2 minutes to about 15 minutes, for each incubation. In some embodiments, the incubation time is from about 1 minute to about 10 minutes or from about 3 minutes to about 7 minutes. In some embodiments, the incubation time is about 5 minutes.

The method can comprise preserving the bioparticles after the sample fluid has been loaded. In some embodiments, the method comprises applying a storage buffer to the microwell array after a sample fluid is loaded. The storage buffer can operate to preserve the bioparticles or one or more biomaterials within the bioparticles. In some embodiments, the storage buffer operates to preserve polynucleic acids such as RNAs in the cells. The method can further comprise incubating the bioparticles in the presence of a storage buffer. In some cases, the method can comprise removing the loading ring after a sample fluid is loaded. In some cases, the loading ring is removed after the storage buffer has been loaded.

The method can comprise sealing at least a portion of the microwells with the membrane. In some embodiments, the method comprises applying the membrane assembly onto the microwell array. The membrane assembly can be applied using the plunger, to which it is attached. The membrane assembly can be applied using the membrane frame. In some embodiments, the membrane assembly is pre-assembled with the plunger, such that the membrane can be applied to the microwells by applying a downward force on the plunger. In some embodiments, the plunger can be snapped into the loading assembly. In some embodiments, at least a fraction of the standing fluid is displaced after the application of the membrane assembly. In some embodiments, the excess fluid on the microwell array is displaced after the membrane is applied. For example, the excess fluid can be displaced to the recessed area of the array. The displaced fluid can comprise a fraction of the sample fluid, a fraction of the wetting solution, a fraction of the wash buffer, a fraction of the storage buffer, or a combination thereof. The displaced fluid can be removed from one or more ports located on the side of the base. In some embodiments, a curved surface on the bottom surface of the plunger can facilitate the displacement of excess fluid. In some cases, a curved surface of a plunger can enable robust liquid evacuation between a membrane and an array during plunger compression by providing a route for fluid flow during depression. In some cases, a curved surface of a plunger can be critical for evacuation of a bulk liquid present on an array during membrane attachment. In some embodiments, the displaced excess fluid is removed, for example, through pipetting via the ports.

The method can comprise contacting at least a portion of the top surface of the microwell array with at least a portion of the membrane bottom surface. In some embodiments, the contact can retain at least one bioparticle in a microwell. In some embodiments, the contact occurs simultaneously with the application of the membrane assembly onto the microwells. In some embodiments, the contact occurs subsequently to the application of the membrane assembly. In some embodiments, at least 80%, at least 90%, at least 91%, at least 92%, at least 93%, at least 94%, at least 95%, at least 96%, at least 97%, at least 98%, at least 99%, or at least 99.9% of the microwells on the array are sealed by the membrane through the contact. In some embodiments, at least 80%, at least 90%, at least 91%, at least 92%, at least 93%, at least 94%, at least 95%, at least 96%, at least 97%, at least 98%, at least 99%, or at least 99.9% of the top surface of the array is in contact with the membrane bottom surface. In some embodiments, at least 80%, at least 90%, at least 91%, at least 92%, at least 93%, at least 94%, at least 95%, at least 96%, at least 97%, at least 98%, at least 99%, or at least 99.9% of the bioparticles in the microwells are retained. A person skilled in the art can appreciate that in the presence of a permeable or semi-permeable membrane, the sealed microwells can be in fluidic communication with any liquid outside of the microwells. A person skilled in the art can also appreciate that in the presence of a permeable or semi-permeable membrane, objects, which are capable of passing through the membrane pores, can enter and exit the microwells through the membrane.

In some embodiments, a molecular bonding is formed between the array top surface and the membrane bottom surface after the contact. The molecular bonding can be formed after a period time of contact. The formation of the molecular bonding can also require pressure, temperature, or both. In some embodiments, the molecular bonding is formed at ambient temperature or above. In some embodiments, the molecular bonding is formed after 1 minute, 2 minutes, 5 minutes, 10 minutes or more.

The methods can comprise storing at least one retained bioparticle for one or more days. The cassette or system that comprises the bioparticle can also be placed into long term storage at a temperature below 0° C., including for example at about −80° C. or at about −20° C. In some embodiments, a method described herein comprises storing a cassette or system that comprises a bioparticle at a temperature of about 40° C., about 30° C., about 20° C., about 10° C., about 4° C., about 0° C., about −10° C., about −20° C., about −30° C., about −40° C., about −50° C., about −60° C., about −70° C., or about −80° C. In some embodiments, the method comprises storing a cassette or system that comprises a bioparticle at a temperature within a range of 0 to −20° C., 0 to −30° C., 0 to −50° C., 0 to −80° C., −20° C. to −80° C., or any ranges therebetween. In some embodiments, the method comprises storing a cassette or system that comprises a bioparticle at ambient temperature. In some embodiments, the cassette or system that comprises one or more bioparticles is stored for a period of time that is between 1 hour and 30 years, or any ranges therebetween. For example, the cassette or system can be stored for at least 1 day, at least 1 week, at least a month, at least 2 months, at least 3 months, at least 4 months, at least 5 months, at least 6 months, or at least a year. For example, the cassette or system can be stored for at most 1 day, at most 1 week, at most a month, at most 2 months, at most 3 months, at most 4 months, at most 5 months, at most 6 months, at most a year, at most 5 years, at most 10 years, or at most 30 years. In some embodiments, a cassette or system described herein is stored for a period of 30 years or longer. The method can further comprise shipping the cassette or system that comprises one or more bioparticles. In some embodiments, the cassette or system is shipped from a point of care facility such as a clinic to a central processing and/or analytical center.

The method can further comprise releasing the plunger from the membrane assembly, thereby exposing the membrane top surface. Alternatively, the method can comprise other means of exposing the backside of the membrane (i.e., membrane top surface). After the membrane top surface is exposed, bioparticles retained in the microwells can be further processed. In some embodiments, such processing comprises lysing the cells retained in the microwells. In some embodiments, the method comprises contacting one or more lysis buffers with the array. The method can comprise lysing at least one cell, thereby releasing an RNA from the cell. The released RNA can then be captured by a capture bead that is resident in the same microwell as the lysed cell. Accordingly, in some embodiments, the method comprises capturing RNA on a bead resident in the same microwell as at least one cell. In some embodiments, other biomaterials released by the cell such as a DNA, an antibody, or a protein is captured by the capture bead.

The beads can be pre-loaded into the microwells. In some cases, a microwell array can be pre-loaded with a plurality of beads. In some embodiments, the beads are pre-loaded in a dry state. Alternatively, the beads can be loaded before, after, or simultaneously as the sample fluid. In some embodiments, at least 80%, at least 90%, at least 91%, at least 92%, at least 93%, at least 94%, at least 95%, at least 96%, at least 97%, at least 98%, at least 99%, or at least 99.9% of the microwells are loaded with a single bead. In some cases, the beads are barcoded transcript capture beads. In some embodiment, depending on the application, one or more stimuli can be added to the microwells.

The method can comprise aggregating the one or more bioparticles in the microwells. In some cases, the method comprises removing the membrane assembly from the microwell array, thereby exposing the sealed bioparticles. In some embodiments, the membrane frame is removed from the microwells. In some embodiments, the membrane is removed from the microwells. The membrane can be removed by lifting the membrane frame. The membrane can also be removed by pealing or punching a hole in the membrane. In some cases, the method comprises collecting at least a portion of the bioparticles. In some cases, the method comprises collecting at least a portion of the plurality of beads. The bioparticles and/or beads can be aggregated using a bead collection device. An exemplary bead collection device is illustrated in FIG. 8. As illustrated in FIG. 8, the exemplary collection device has a conical shape with a hole at the center configured for bead collection. In some embodiments, each bead collection device is configured to collect the beads from a single cassette. In other embodiments, each bead collection device is configured to collect the beads from two or more cassettes, e.g., all the cassettes on a SBS frame. In some embodiments, the bioparticles and/or beads are aggregated using a bead collection plate.

In some cases, a method can further comprise generating cDNA from a captured RNA such that a sequence of a bead barcode can be incorporated into a cDNA. Provided herein is a method for spatially locating transcripts on the microwell array. The method can comprise contacting the array with a plurality of cells containing one or more transcripts; generating cDNA from the transcripts on a barcoded capture bead such that the sequence of the unique bead barcode is incorporated into the cDNA. The unique spatial barcode can be simultaneously released from the microwell surface, enabling binding of the spatial barcode to the barcoded capture bead, thereby generating a fusion of the spatial barcode and bead barcode. In some embodiments, the fusion is generated by extending the bead capture probe through the hybridized spatial barcode sequence during the reverse transcription reaction. In some embodiments, the location of the transcript on the array can be located by matching the bead barcode present in the cDNA molecule to a bead barcode-spatial barcode fusion sequence in the sequencing data.

In some cases, automation can be used to perform these methods. It will be appreciated that the same approach can be adopted for other nucleic acid sources that may be analyzed using the methods and products of this disclosure including without limitation viruses, nuclei, exosomes, platelets, etc.

In some embodiments, the cassettes, systems, and kits described herein are functionalized to perform single-cell RNA-seq, e.g., as described in WO2017124101A2, U.S. patent application Ser. No. 16/213,551, and "Seq-Well: portable, low-cost RNA sequencing of single cells at high throughput," Nature Methods, 395 (14:4) 2017, which are hereby incorporated by reference in their entirety.

EXEMPLARY EMBODIMENTS

Example 1. A Loading Assembly as Shown in FIGS. 1A-1B

Figure 1B:
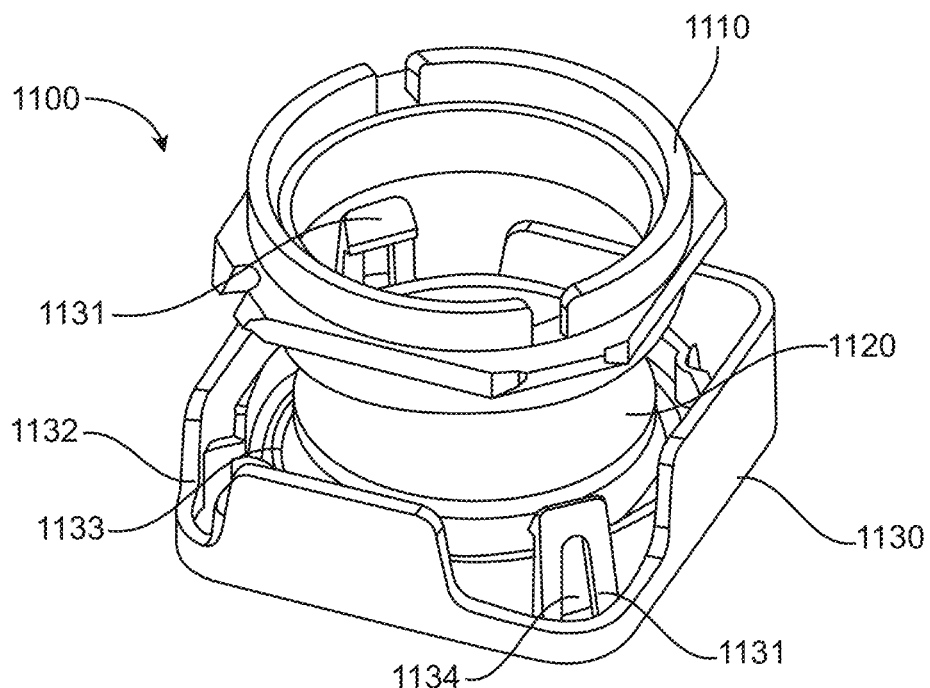

An exemplary loading assembly 1100, illustrated in FIGS. 1A-1B, comprises the microwell array 1120, the base of the loading assembly 1130 that can support the microwell array, a locking mechanism such as the snap clips 1131, the loading ring 1110, and the port for fluid collection 1132. The base 1130 can comprise a recessed area 1133 that is configured to accommodate excess fluid. A key hole 1134 on the loading assembly behind a snap clip 1131 is shown in FIG. 1B.

Example 2. A Loading Assembly

An exemplary loading assembly comprises a microwell array 1120, the base of the loading assembly 1130, a locking mechanism such as the snap clips 1131, the loading ring 1110, and the port for fluid collection 1132. In this embodiment, the port for fluid collection 1132 is located at the bottom of the base.

Example 3. A Loading Assembly as Shown in FIGS. 2A-2B

Figure 2A:
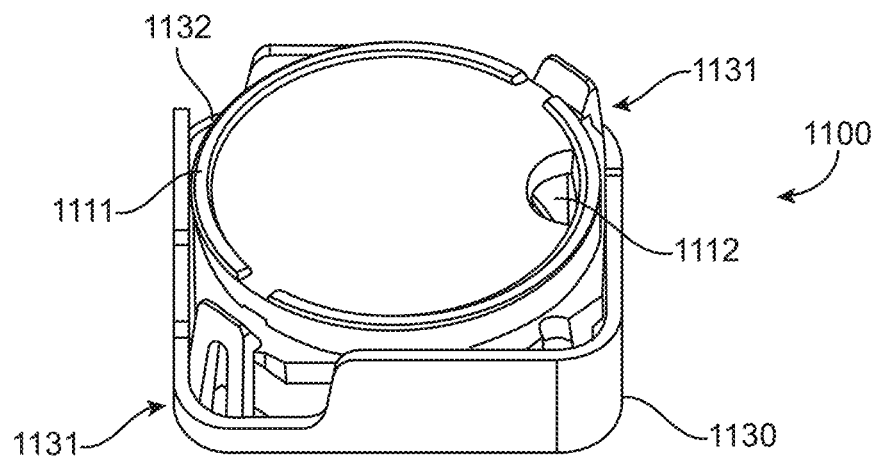
FIGS. 2A-2B illustrate a perspective view of an embodiment of the loading assembly with an injection lid attached.
Figure 2B:
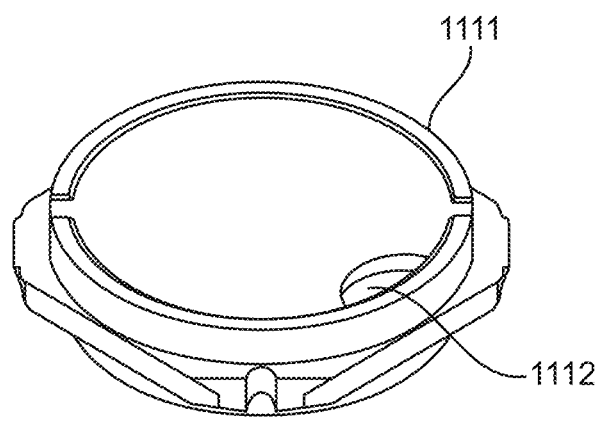

An exemplary loading assembly 1100, illustrated in FIGS. 2A-2B, comprises the injection lid 1111, the base of the loading assembly 1130, a locking mechanism such as the snap clips 1131, and the port for fluid collection 1132, and a cutout on the injection lid for guiding pipetting 1112. Although the cutout on the injection lid is shown in FIGS. 2A-2B to be on the side of the lid, it can be situated in any position of the lid such as at the center of the lid.

Example 4. A Microarray as Shown in FIGS. 3A-3B

Figure 3A:
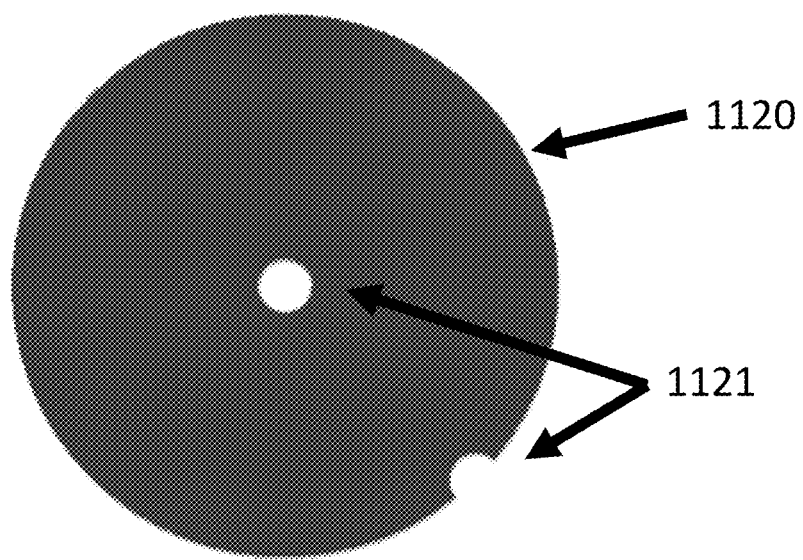
FIG. 3A shows a top view of a microwell array with cutout holes.

An exemplary microarray 1120 with cutouts 1121 is illustrated in FIG. 3A. The cutouts can be used to recover capture beads from the collection device at the end of the capture process.

Figure 3B:
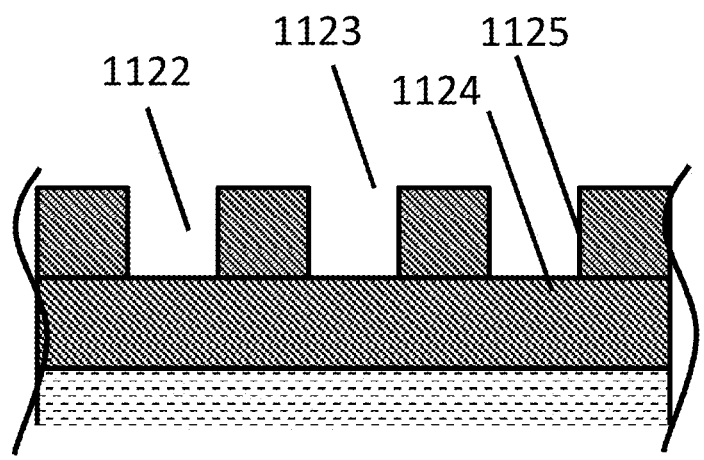
FIG. 3B illustrates a cross section of a portion of a microwell array, illustrating 3 individual microwells.

A cross section of an exemplary microarray 1120 showing 3 individual microwells 1122 is illustrated in FIG. 3B (the rest of the microwells on the array are not shown). Each of the microwells 1122 comprises an opening at the top 1123, a bottom surface 1124 and a side surface 1125.

Example 5. A Microarray with Optionally One Cutout

An exemplary microarray 1120 can have only one cutout 1121. The cutout can be used to guide the pipetting of samples or recover beads from the collection device. The cutout can be situated anywhere on the microarray. For example, a microarray can comprise a cutout at the center or on the side of the microarray. In some exemplary microarrays, the cutout is absent.

Example 6. A Plunger Assembly and a Membrane Assembly as Shown in FIGS. 4A-4B

An exemplary plunger assembly 1200, illustrated in FIGS. 4A-4B, comprises a top surface (i.e., snap top) 1230, snap clips 1211 that function to lock the plunger assembly in place with the loading assembly, and a plunger 1220 that has a plunger bottom surface 1221 and a plunger side surface 1222 that has optional vertical groves on it.

An exemplary membrane assembly 1300, illustrated in FIGS. 4A-4B, comprises a membrane 1320 and a membrane frame 1310. The membrane comprises a membrane bottom surface 1321 and a membrane top surface (not shown in FIGS. 4A-4B).

The membrane assembly 1300 can be reversibly attached to the plunger assembly (FIG. 4A), and they can be detached (FIG. 4B).

The membrane assembly 1300 can optionally comprise a locking mechanism (not shown in FIG. 4A-4B), such as snap clips. One locking mechanism on the membrane assembly can engage with a locking snap of the plunger assembly, thereby locking in place the membrane assembly with the plunger assembly. A second locking mechanism on the membrane assembly can engage with a locking snap of the loading assembly, thereby locking in place the membrane and plunger assembly with the loading assembly. The locking mechanism can operate mechanical (such as a snap trap), by friction, or by any other suitable means.

Example 7. A Fully Snapped Cassette as Shown in FIG. 5

Figure 5:
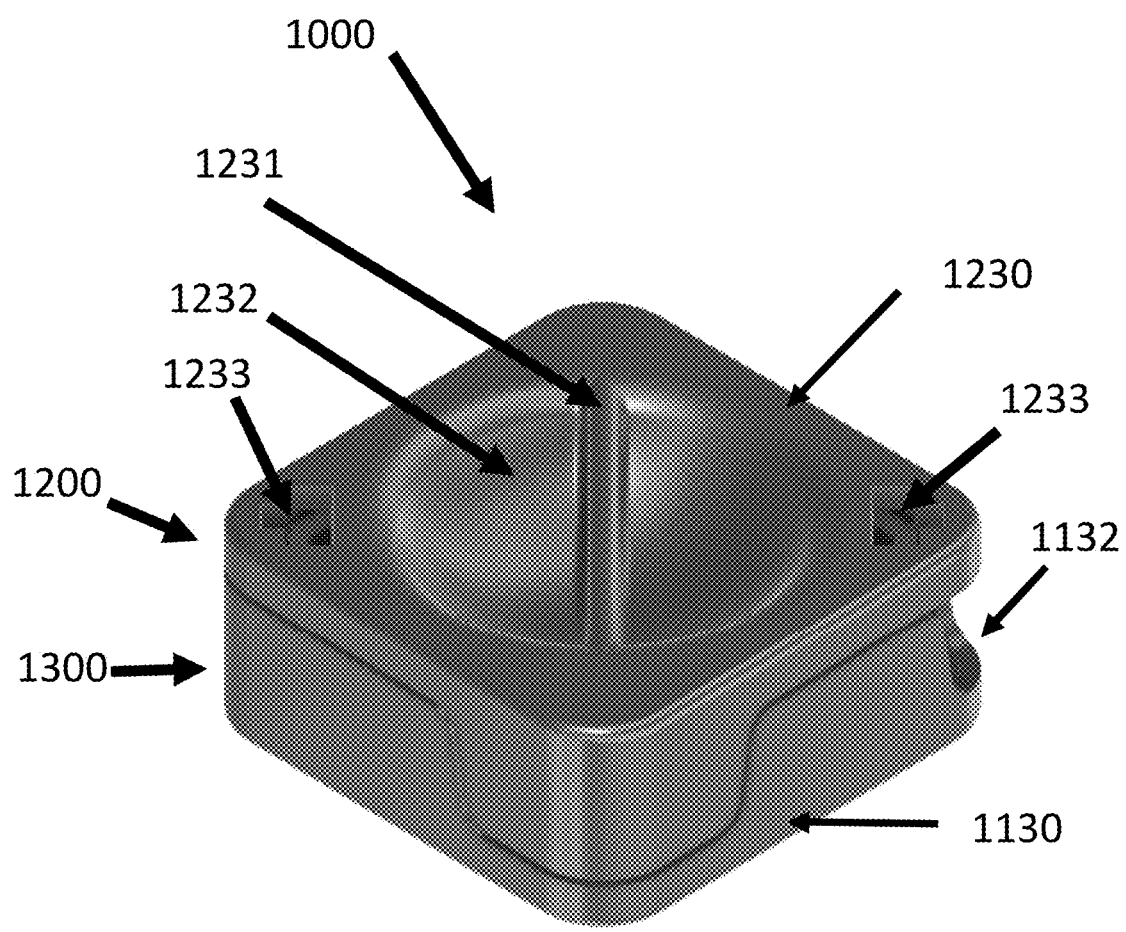
FIG. 5 shows a perspective view of a fully snapped device, illustrating the snapped cassette, the port for fluid collection, the base of the loading assembly, and the top surface of the plunger assembly including a handle, a concave surface, and openings for the keys.

An exemplary fully snapped cassette 1000, illustrated in FIG. 5, comprises a plunger assembly 1200 at the top, a loading assembly 1100 at the bottom, and additional interior components that are not shown (e.g., a membrane assembly 1300). The snap top 1230 of the plunger assembly 1200 is illustrated, which comprises on its top surface a handle 1231 that can be used to open, close, or otherwise manipulate the cassette (e.g., detaching or attaching the plunger assembly to the loading assembly), a concave surface area 1232 that is figured to allow the applicator to conveniently access the handle, and one or more openings 1233 that are part of a locking mechanism, which enables multiple cassettes to be opened on a SBS frame simultaneously and/or automatically. The base of the loading assembly 1130, which comprises a port for fluid collection 1132, is also illustrated in FIG. 5.

Example 8. A Cassette System that Comprises Six Fully Snapped Cassettes as Shown in FIG. 6

Figure 6:
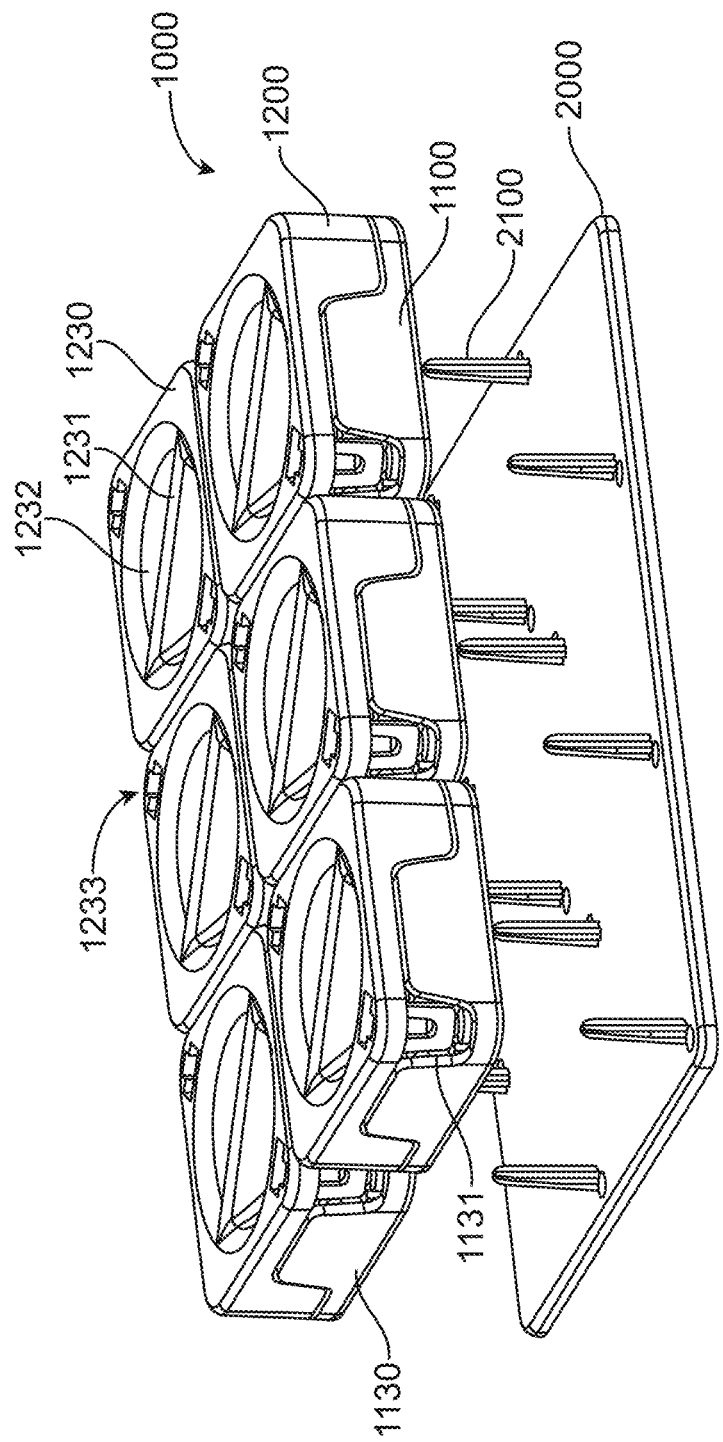
FIG. 6 shows a perspective view of the cassette system that comprises six fully snapped cassettes being inserted onto a Society for Biomolecular Screening (SBS) frame. The SBS frame, the keys on the SBS frame, the snapped cassettes, the base of the loading assembly, the snap clips, and the top surface of the plunger assembly including a handle, a concave surface, and openings for the keys are illustrated. Multiple appearances of the same components are only labeled once in FIG. 6.

An exemplary cassette system, illustrated in FIG. 6, comprises an SBS frame 2000 and six fully snapped cassettes 1000. The SBS frame 2000 comprises multiple keys 2100 on the top side of its surface. The keys 2100 protrude upward from the SBS frame 2000 and they have a cross section that is shaped as a cross sign. As illustrated, when viewed from the side, the keys are narrower at the top and have a smaller cross section at the tip to allow for easy insert into the cassettes. The keys and the snap clips on the cassettes are configured such that when the keys are inserted into the corresponding slots on the cassettes, the plunger assembly will be detached from the loading and membrane assemblies (not shown).

Each of the cassettes 1000, illustrated in FIG. 6, comprises a plunger assembly 1200 at the top, a loading assembly 1100 at the bottom, and additional interior components that are not shown (e.g., a membrane assembly 1300). The snap top 1230 of the plunger assembly 1200 is illustrated, which comprises on its top surface a handle 1231 that can be used to open, close, or otherwise manipulate the cassette (e.g., detaching or attaching the plunger assembly to the loading assembly), a concave surface area 1232 that is figured to allow the applicator to conveniently access the handle, and one or more openings 1233 that are part of a locking mechanism, which enables multiple cassettes to be opened on a SBS frame simultaneously and/or automatically. As shown in FIG. 6, the snap top has a flat top surface, enabling stacking of the cassettes and convenient storage.

The base of the loading assembly 1130, which comprises snap clips 1131, is also illustrated.

Example 9. A Cassette System that Comprises Six Opened Cassettes on an SBS Frame as Shown in FIG. 7

Figure 7:
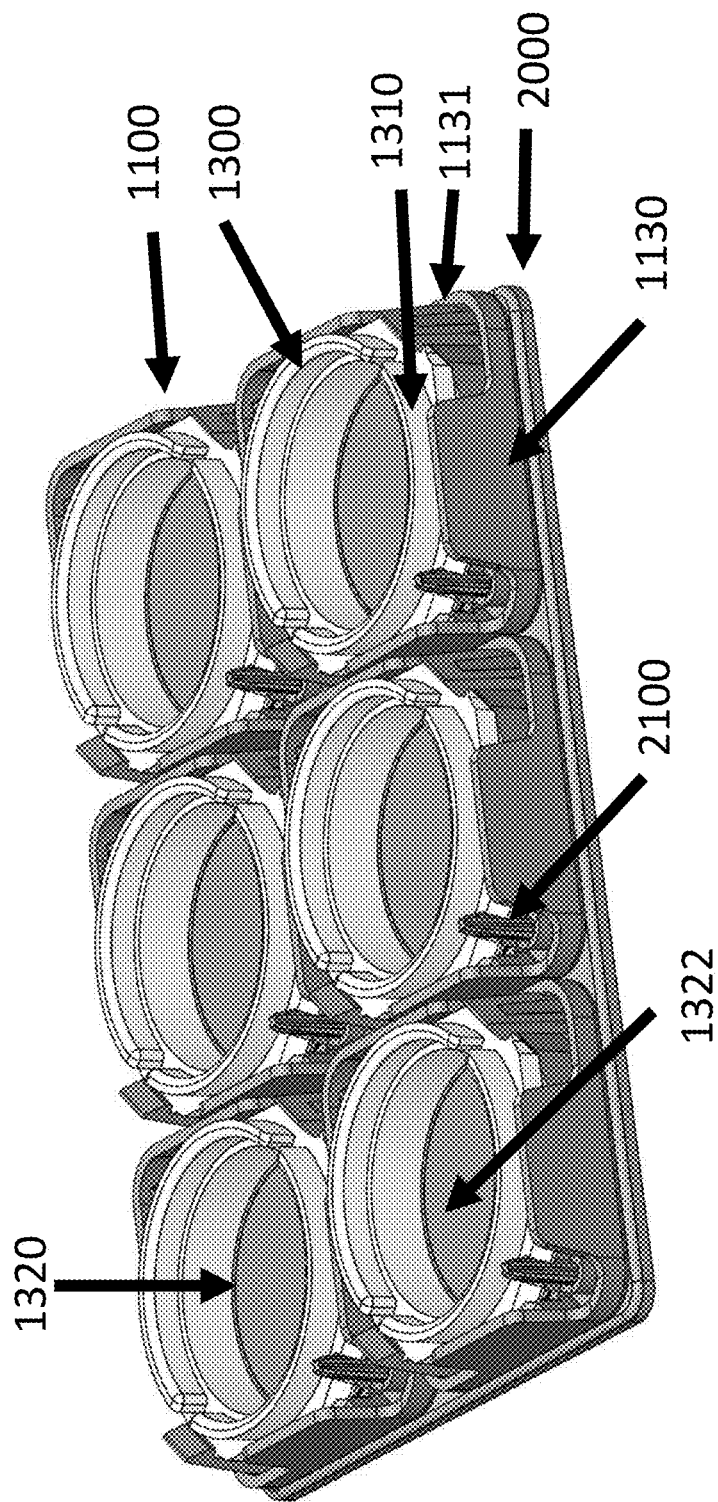
FIG. 7 shows a perspective view of opened cassettes on a SBS frame with membrane assembly attached. The SBS frame, the keys on the SBS frame, the loading assembly, the base of the loading assembly, the snap clips, the membrane, the top surface of the membrane, and the membrane frame are illustrated. Multiple appearances of the same components are only labeled once in FIG. 7.

An exemplary cassette system, illustrated in FIG. 7, comprises an SBS frame 2000 and six opened cassettes that each comprises a membrane assembly 1300 and a loading assembly 1100. The SBS frame 2000 comprises multiple keys 2100 on the top side of its surface. The keys 2100 protrude upward from the SBS frame 2000 and they have a cross section that is shaped as a cross sign. As illustrated, when viewed from the side, the keys are narrower at the top and have a smaller cross section at the tip to allow for easy insert into the cassettes. Upon the insertion of the keys into the corresponding slots on the cassettes, the plunger assemblies (not shown) are detached from the loading assemblies. Each of the membrane assemblies 1300 comprises a membrane frame 1310 and a membrane 1320. The membrane has a membrane bottom surface (not shown) and a membrane top surface 1322. Each of the loading assemblies 1100 comprises a base 1130, snap clips 1131, and additional components not shown in this figure (e.g., a microarray).

Example 10. A Cassette System that Comprises Six Opened Cassettes on an SBS Frame as Shown in FIG. 8

An exemplary cassette system, illustrated in FIG. 8, comprises an SBS frame 2000 and six opened cassettes that each comprises a loading assembly 1100. The SBS frame 2000 comprises multiple keys 2100 on the top side of its surface, which protrude upward from the SBS frame 2000. The keys 2100 are inserted into the key holes of the loading assembly. Each of the loading assemblies 1100 comprises a base 1130, snap clips 1131, and microarray 1120.

Example 11. A Cassette System that Comprises Six Cassettes and Collection Devices on an SBS Frame as Shown in FIG. 9

Figure 9:
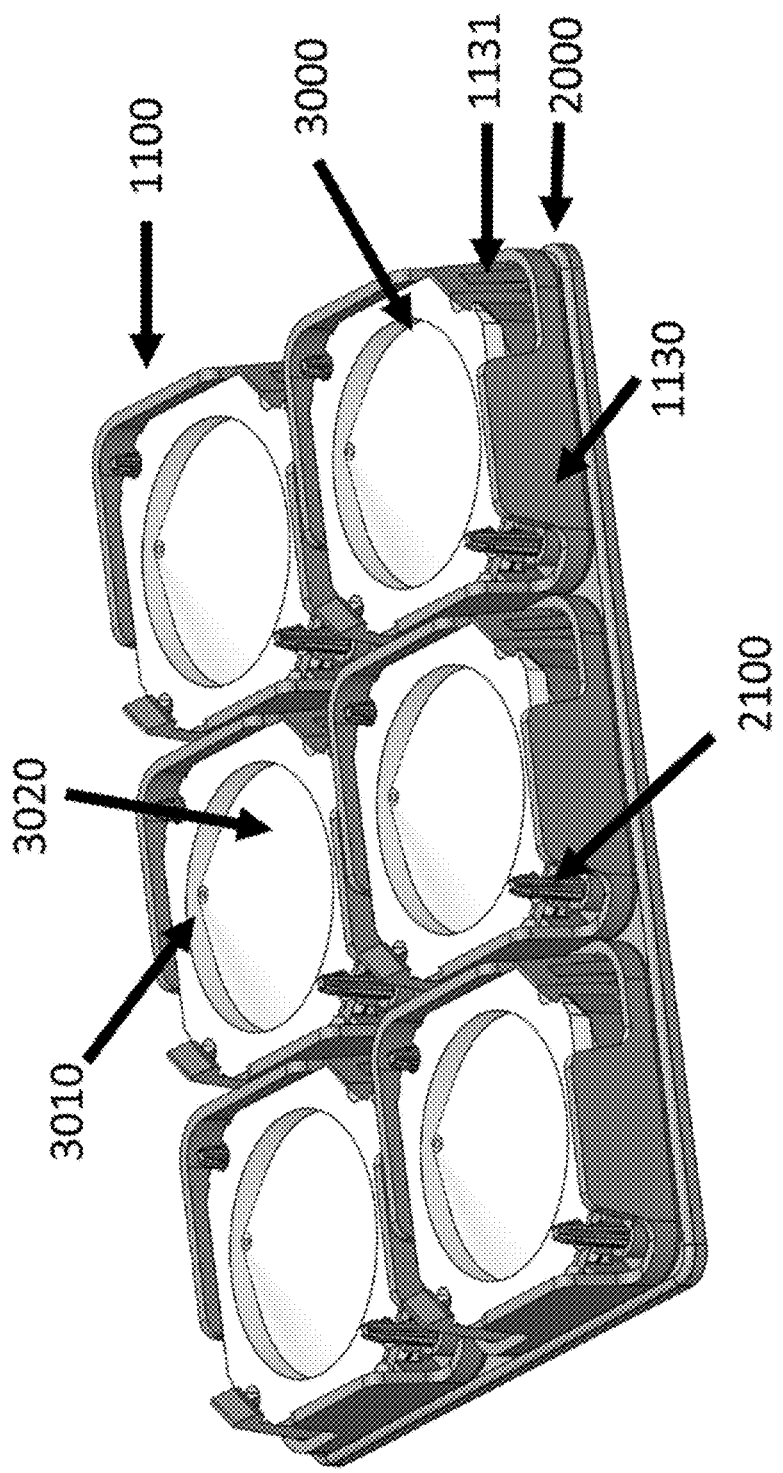
FIG. 9 shows a perspective view of the cassette system that comprises conically shaped collection devices attached to the arrays. The SBS frame, the keys on the SBS frame, the loading assembly, the base of the loading assembly, the snap clips, and the collection devices with an opening on the conically shaped top surface are illustrated. Multiple appearances of the same components are only labeled once in FIG. 9.

An exemplary cassette system, illustrated in FIG. 9, comprises an SBS frame 2000 and six cassettes that each comprises a loading assembly 1100 and a collection device 3000. The SBS frame 2000 comprises multiple keys 2100 on the top side of its surface. The keys 2100 protrude upward from the SBS frame 2000. Each of the loading assemblies 1100 comprises a base 1130, snap clips 1131, and additional components not shown in this figure (e.g., a microarray). Each of the collection devices 3000 comprises a conically shaped top surface 3020 and an optional small opening 3010 at the center of the top surface that is configured to allow beads to pass through when the cassette is inverted.

Example 12. Protocol of Use

An exemplary protocol of use can be seen in FIG. 10 and FIG. 11.

Array wetting (shown in FIG. 10A). 1 mL of methanol was added to wet the microarray and allowed to incubate for 5 minutes. The microarray was then washed three times with PBS with 0.1% bovine serum albumin (BSA).

Sample loading (shown in FIG. 10B). The wetting solution was then removed with a 1 ml pipette, and 1 ml of cell suspension was added and allowed to incubate statically for five minutes. The solution was then agitated by pipetting three times and again allowed to incubate for five minutes.

Cell fixing (shown in FIG. 10C). The cells were fixed by washing twice with PBS, followed by the addition of storage buffer, and ten minutes of incubation (optional).

Figure 11A:
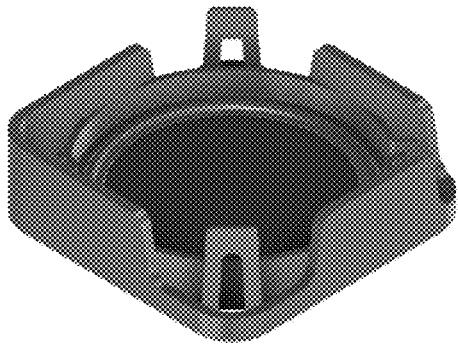
FIGS. 11A-11C illustrate an exemplary protocol including unsnapping a loading ring (FIG. 11A), snapping in a membrane/plunger (FIG. 11B), and aspirating excess storage buffer (FIG. 11C). The loading ring is not shown in FIG. 11A, and the membrane assembly is not shown in FIG. 11B.

Loading ring removal (shown in FIG. 11A). The loading ring was unsnapped.

Figure 11B:
Figure 11C:

Snapping in membrane/plunger (shown in FIG. 11B). After the loading ring was removed, the snap-in top with membrane assembly/plunger assembly was snapped in. The liquid that is situated on the microarray can be displaced when the membrane assembly is attached to the loading assembly.

Removal of excess storage buffer (shown in FIG. 11C) (optional). The excess storage buffer was aspirated using a pipette. The microarray can be tilted toward the port (or opening) for fluid collection to allow all displaced liquid to flow there for removal.

Example 13. Alternative Protocol

An exemplary alternative protocol can also be seen in FIG. 10 and FIG. 11. 1 mL of PBS with 0.1% bovine serum albumin (BSA) was added to wet the microarray and it was allowed to incubate from between 1 hour to overnight. The wetting solution was then removed with a 1 ml pipette, and 1 ml of cell suspension was added and allowed to incubate statically for five minutes. The solution was then agitated by swirling and again allowed to incubate for five minutes. The cells were fixed by the addition of storage buffer, and ten minutes of incubation. The loading ring was unsnapped, and the snap-in top with membrane assembly/plunger assembly was snapped in. The excess storage buffer was aspirated using a pipette.

Example 14. A Cassette as Shown in FIGS. 12A-12C

Figure 12A:
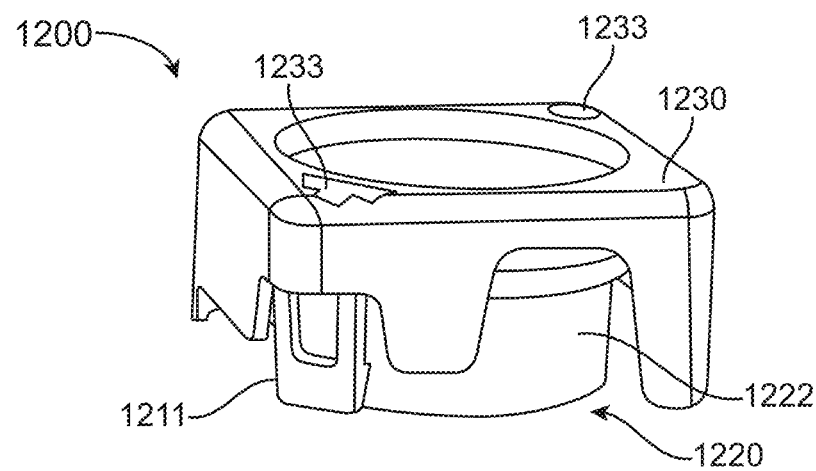
FIGS. 12A-12C illustrate a perspective view of an embodiment of a cassette.
Figure 12B:
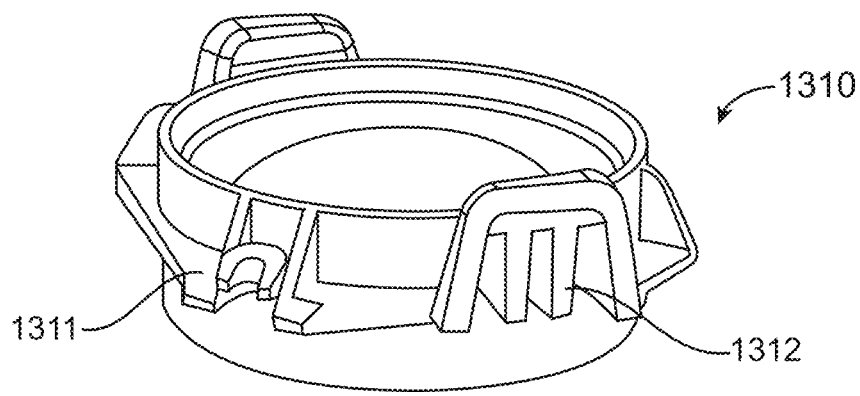
Figure 12C:
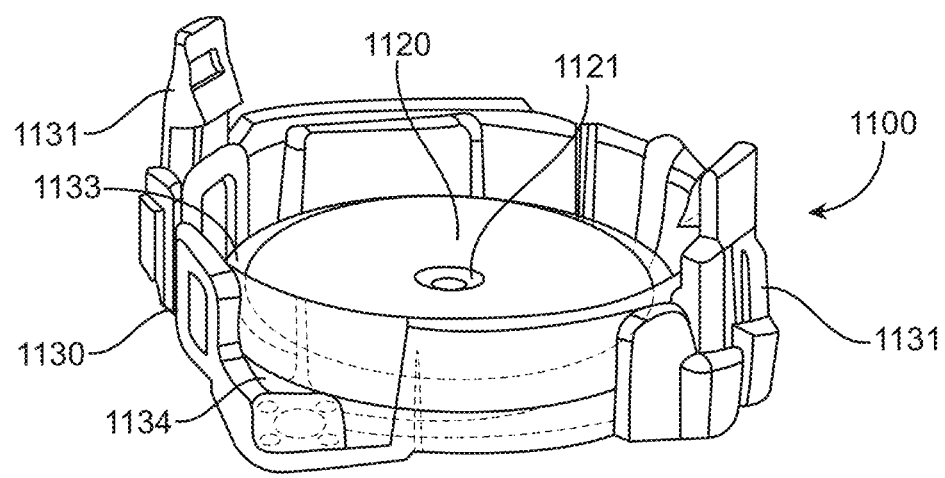

An exemplary cassette that comprises a plunger assembly 1200, a membrane assembly 1300, and a loading assembly 1100 is shown in FIGS. 12A-12C.

An exemplary plunger assembly 1200, illustrated in FIG. 12A, comprises a top surface (i.e., snap top) 1230, snap clips 1211 that function to lock the plunger assembly 1200 in place with the loading assembly 1100 and/or the membrane assembly 1300, and a plunger 1220 that has a plunger bottom surface (not shown) and a plunger side surface 1222. The plunger top surface 1230 comprise key openings 1233.

An exemplary membrane assembly 1300, illustrated in FIG. 12B, comprises a membrane (not shown) and a membrane frame 1310. The membrane frame comprises snap clips 1311 and finger grips 1312. The membrane assembly 1300 can be reversibly attached to the plunger assembly 1200. The membrane assembly 1300 can be reversibly attached to the loading assembly 1100.

An exemplary loading assembly 1100, illustrated in FIG. 12C, comprises the microwell array 1120, the base of the loading assembly 1130 that can support the microwell array, and a locking mechanism such as the snap clips 1131. The base 1130 comprises a recessed area 1133 that is configured to accommodate excess fluid. The base 1130 comprises a key hole 1134 that is configured to insert a key that can disengage a locking mechanism. The base 1130 can optionally comprise a port for fluid collection, which is not present in the exemplary loading assembly of FIC. 12C.

The examples and embodiments described herein are for illustrative purposes only and various modifications or changes suggested to persons skilled in the art are to be included within the spirit and purview of this application and scope of the appended claims.

What is claimed is:

1. A cassette for collecting, storing, or analyzing bioparticles, said cassette comprises, from top to bottom:
    (a) a plunger assembly that comprises a top surface, a plunger, and a top locking member, wherein said plunger comprises a bottom surface;
    (b) a membrane assembly that comprises:
        i. a semi-permeable membrane that comprises a membrane top surface and a membrane bottom surface, and
        ii. a membrane frame configured to reversibly attach to said plunger assembly, wherein said semi-permeable membrane is attached to said membrane frame, and wherein said membrane assembly is configured to allow at least a portion of said bottom surface of said plunger to be in contact with said membrane top surface when said membrane frame is attached to said plunger assembly; and
        iii. a bottom locking member that is configured to engage with said top locking member; and
    (c) a loading assembly that comprises a microwell array situated on a base, wherein said microwell array comprises a top surface and a plurality of microwells.

2. The cassette of claim 1, wherein when said membrane frame is attached to said plunger assembly, said bottom surface of the plunger is in contact with said membrane top surface through a fluid reservoir that comprises an adsorbent material and a cell preservation solution.

3. The cassette of claim 1, wherein said base comprises one or more ports for fluid collection.

4. The cassette of claim 1, wherein at least one of said microwells comprises a single bioparticle.

5. The cassette of claim 1, wherein the cassette comprises at least 1000 microwells that each comprises a single bioparticle.

6. The cassette of claim 4, wherein said single bioparticle is a single cell or a single bead.

7. A method for collecting, storing, or analyzing bioparticles using a cellular cassette,
    wherein said cellular cassette comprises:
        (a) a plunger assembly that comprises a plunger;
        (b) a membrane assembly that comprises a membrane frame and a membrane that comprises a membrane top surface and a membrane bottom surface; and
        (c) a loading assembly that comprises a base and a microwell array situated on the base, wherein said microwell array comprises a top surface and a plurality of microwells;
    wherein said method comprising:
        (a) loading a sample fluid that comprises one or more bioparticles onto said microwell array, thereby loading at least one bioparticle into one of said microwells;
        (b) applying said membrane assembly onto said microwell array, wherein said membrane assembly is attached to said plunger assembly; and
        (c) contacting at least a portion of said top surface of said microwell array with at least a portion of said membrane bottom surface, and wherein said contact retains at least one bioparticle in one of said microwells.

8. The method of claim 7, wherein said applying and said contacting occur simultaneously.

9. The method of claim 7 or 8, wherein said membrane is semi-permeable.

10. The method of claim 7, wherein each of said plurality of microwells comprises an opening at the top and a bottom surface, wherein the bottom surface comprises semi-permeable membrane.

11. The method of claim 7, wherein said method comprises wetting said microwell array before said sample fluid is loaded.

12. The method of claim 7, further comprising incubating said loaded sample fluid.

13. The method of claim 7, further comprising applying a storage buffer to said microwell array after said sample fluid is loaded.

14. The method of claim 7, wherein said membrane assembly is reversibly attached to said plunger.

15. The method of claim 14, wherein said plunger comprises a top surface and a bottom surface, and wherein at least a portion of said plunger bottom surface contacts said membrane top surface.

16. The method of claim 15, wherein said at least a portion of said plunger bottom surface contacts said membrane top surface directly or through a medium.

17. The method of claim 7, wherein said contact between the top surface of the microwell array and the membrane bottom surface retains at least 1000 bioparticles in said microwells.

18. The method of claim 7, further comprising storing said retained at least one bioparticle for one or more days.

19. The cassette of claim 1, wherein said loading assembly is configured to allow said top surface of said microwell array to be in contact with said membrane bottom surface, thereby sealing the microwell array.

20. The cassette of claim 1, wherein said cassette comprises a locking mechanism that is configured to lock said plunger assembly and said membrane assembly in place with said loading assembly.

21. The cassette of claim 20, wherein said locking mechanism is configured to maintain a contact between said top surface of said microwell array and said membrane bottom surface.

22. The cassette of claim 1, wherein said at least a portion of said bottom surface of said plunger is in direct contact with said membrane top surface when said membrane frame is attached to said plunger assembly.

23. The cassette of claim 1, wherein said semi-permeable membrane has an average pore diameter of about 1 nm to about 200 nm.

24. The cassette of claim 1, wherein said microwell array comprises about 50,000 to about 150,000 microwells.

* * * * *